United States Patent
Wu et al.

(10) Patent No.: US 11,691,500 B2
(45) Date of Patent: Jul. 4, 2023

(54) STABILIZERS FOR A VEHICLE COOLING MODULE

(71) Applicant: International Engine Intellectual Property Company, LLC, Lisle, IL (US)

(72) Inventors: Shouhao Wu, Roselle, IL (US); Dean Oppermann, Plainfield, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 148 days.

(21) Appl. No.: 17/398,688

(22) Filed: Aug. 10, 2021

(65) Prior Publication Data

US 2023/0050711 A1    Feb. 16, 2023

(51) Int. Cl.
*B60K 11/04* (2006.01)

(52) U.S. Cl.
CPC .................... *B60K 11/04* (2013.01)

(58) Field of Classification Search
CPC ...... B60K 11/04; B60K 11/02; B62D 25/084; B62D 25/085; F01P 3/18; F01P 2070/52
See application file for complete search history.

(56) References Cited

U.S. PATENT DOCUMENTS

| 9,902,254 | B1 * | 2/2018 | Long | B60K 11/04 |
| 2008/0135209 | A1 * | 6/2008 | Lowe | B60K 11/08 165/122 |
| 2019/0176611 | A1 * | 6/2019 | Juaristi Larrinaga | B60K 11/04 |
| 2019/0277582 | A1 * | 9/2019 | Cummins | B60K 11/04 |

FOREIGN PATENT DOCUMENTS

WO    WO-2021244911 A1 * 12/2021 ............. B60K 11/04

* cited by examiner

*Primary Examiner* — Grant Moubry
(74) *Attorney, Agent, or Firm* — Mark C. Bach

(57) ABSTRACT

A stabilizing arrangement of a cooling system module of a vehicle includes stabilizer pins attached to the vehicle cooling system module. Stabilizer slots are incorporated into a component of the chassis of the vehicle, such as a frame extender. The stabilizer slots may be formed as an upwards opening U-shape. Bushings are attached to the stabilizer pins. The stabilizer pins and bushings extend laterally into and engage with the stabilizer slots. Upon installation, the stabilizer pins and bushings are aligned with the stabilizer slots as the cooling system module is lowered onto the ISO mounts. The stabilizer pins and bushings slide vertically downwards into the stabilizer slots as the cooling system module is lowered into place. The simpler stabilizer pins, bushings, and stabilizer slots thereby take the place of expensive, time consuming, complex, labor intensive, and space consuming stay rod arrangements.

15 Claims, 23 Drawing Sheets

STABILIZERS FOR A VEHICLE COOLING MODULE

U.S. GOVERNMENT RIGHTS

This disclosure was made with United States government support under Award No. DE-EE0007767 awarded by the U.S. Department of Energy. The United States government has certain rights in this disclosure.

This disclosure relates to mounting and stabilizing arrangements for vehicle cooling systems.

RELATED ART

Engine cooling systems contain one or more radiators and/or heat exchangers in which engine coolant, intake air, oil, and/or refrigerant is circulated for cooling. The one or more radiators and/or heat exchangers are positioned at or near the front of the vehicle in order to facilitate the passage of ambient air generated by a combination of ram air movement resulting from the forward velocity of the vehicle, and air movement generated by an engine fan. Further, medium and heavy-duty vehicles have chassis that are configured with two generally parallel frame rails that are joined by a series of cross members. These frame rails act as the vehicle's foundation and as mounting points for a number of chassis components, such as for example the engine, transmission, cooling system, and running gear, as well as for the cab and bodywork of the vehicle.

In some cases, the frame is provided with a frame extender to lengthen and/or widen the frame, as well as to provide further mounting surfaces for vehicle components. This frame extender is sometimes referred to in the truck industry as a "mega-bracket" due to its size. As is known, the frame may need to be extended and/or widened to accommodate certain vehicle components, such as for example the cooling system, that would otherwise not be accommodated by the conventional frame alone. In this situation, certain vehicle components may be mounted to the frame extender instead of being mounted directly to the frame. A frame extender that allows vehicle components to be quickly secured to the vehicle structure is especially important in modern manufacturing processes. In a typical manufacturing process, certain major components of the vehicle may be subassembled away from each other at different locations. The manufacturer may then mount these components or subsystems to the vehicle frame and/or to frame extender at a primary vehicle assembly line that is designed to maximize the quantity of the vehicles that can be produced and the speed of their production.

Conventional vehicle cooling systems are mounted by way of rubber isolators to the vehicle frame, to the cross member, and/or to the frame extender, or to brackets attached thereto. Typically, there are two mounting points, one on each side of the cooling system. These two mounting points may be underneath the cooling system, or may located on the sides of the cooling system. In either case, in order to prevent the cooling system from pivoting about the two mounting points, stay rods are provided. The stay rods may attach to the cooling system above the two mounting points, for example in an arrangement wherein the two mounting points are underneath the cooling system. Alternately, the stay rods may attach to the bottom of the cooling system, for example in an arrangement wherein the two mounting points are located on the sides of the cooling system. The distal ends of the stay rods are attached to a sturdy part of the vehicle, such as the vehicle frame or cross members.

Connecting the stay rods to the cooling system and to the vehicle frame or cross members is time consuming and labor intensive. The stay rod assemblies consist of several parts, including brackets used to attach the stay rod assemblies to the cooling system, isolators connecting the stay rods to the brackets, and additional isolators typically located at the frame or cross member mounting point. The isolators are needed to ensure that stress and vibration are not transmitted to the cooling system by way of the stay rods. Often, these isolators include several pieces of hardware, such as a bushing, bolt, washer, and nut, which require time-consuming assembly at the point where the cooling system is installed into the vehicle. Furthermore, the space between the cooling system and the front of the engine is typically congested with hoses, fan shrouding, and other vehicle componentry, so that the stay rods further hinder access for the purposes of assembly and maintenance.

Accordingly, there is an unmet need for an arrangement and method for preventing a cooling system from pivoting about its two mounting points, which minimizes the time and labor involved in the assembly thereof and preserves the isolation of the cooling system from stress and vibration, while occupying a minimal amount of valuable underhood space.

SUMMARY

According to one embodiment of the Novel Design of Stabilizers for a Vehicle Cooling Module, a stabilizing arrangement of a cooling system module of a vehicle includes stabilizer pins attached to the vehicle cooling system module or to a component of the chassis of the vehicle. Stabilizer slots are incorporated into the other of the vehicle cooling system module or the component of the chassis of the vehicle. Stabilizer bushings are attached to the stabilizer pins. The stabilizer pins and stabilizer bushings extend laterally into and engage with the stabilizer slots.

According to another embodiment of the Novel Design of Stabilizers for a Vehicle Cooling Module, a vehicle has a stabilizing arrangement for the cooling system module. The stabilizing arrangement includes stabilizer pins attached to the vehicle cooling system module or to a component of the chassis of the vehicle. Stabilizer slots are incorporated into the other of the vehicle cooling system module or the component of the chassis of the vehicle. Stabilizer bushings are attached to the stabilizer pins. The stabilizer pins and stabilizer bushings extend laterally into and engage with the stabilizer slots.

According to yet another embodiment of the Novel Design of Stabilizers for a Vehicle Cooling Module, a method of stabilizing the cooling system module of the vehicle includes several steps. The first step is attaching stabilizer pins to the vehicle cooling system module or to a component of the chassis of the vehicle. The second step is incorporating stabilizer slots into the other of the vehicle cooling system module or the component of the chassis of the vehicle. The third step is attaching stabilizer bushings to the stabilizer pins. The stabilizer pins and stabilizer bushings extend laterally into and engage with the stabilizer slots.

DETAILED DESCRIPTION

Figure 1:
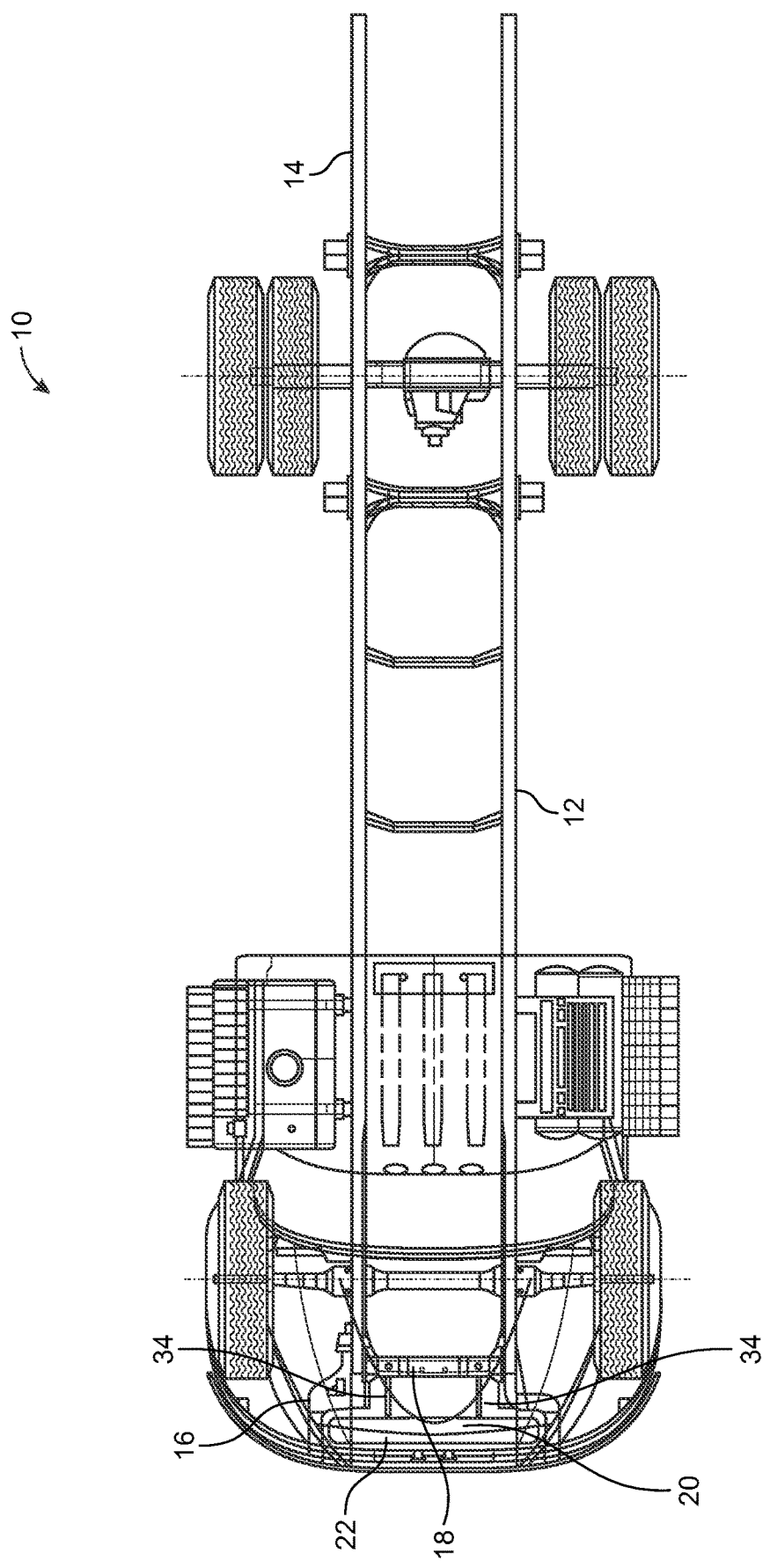
FIG. 1 is a top view of a vehicle chassis, as described herein.

Embodiments described herein relate to a Novel Design of Stabilizers for a Vehicle Cooling Module, which may be embodied as both a method and an arrangement. The method and arrangement may be applied to engines utilizing cooling modules of various types of passenger vehicles, commercial vehicles, and recreational vehicles, such as cars, trucks, SUVs, highway or semi-tractors, straight trucks, busses, fire trucks, motorhomes, and etcetera. It is contemplated that the method and arrangement may be applied to vehicles having drivetrains including a diesel, gasoline, or gaseous fuel engine, as well as to vehicles having hybrid electric drivetrains or other drivetrains retaining the use of a cooling module.

The present arrangement replaces known expensive, time consuming, complex, labor intensive, and space consuming stay rod arrangements with a novel design that stabilizes the cooling system module. This is accomplished by the present arrangement while reducing cost, parts count, weight, complexity, and labor involved in installation and maintenance. For vertical support, the present arrangement still uses standard International Standards Organization (ISO) mounts including, for non-limiting example, rubber isolators. The ISO mounts may be located underneath the cooling system module, or may located on the sides of the cooling system module.

The present arrangement utilizes two stabilizer pins in lieu of stay rods, one on either side of the cooling system module, for non-limiting example attached to the radiator frame, although it is contemplated that the two stabilizer pins may be attached to another component of the cooling system module. The two stabilizer pins may be attached to the cooling system module by welding, bolts, rivets, or other bonding method. Stabilizer bushings, for non-limiting example rubber bushings, may be installed over the two stabilizer pins. Two mating slots are incorporated into sturdy components of the vehicle chassis, for non-limiting example formed into the frame extenders between which the cooling system module may be located.

Although the present arrangement as described herein shows the two stabilizer pins, stabilizer bushings, and two mating stabilizer slots being located vertically beneath the ISO mounts, which are located on the sides of the cooling system module, it is also contemplated that the two stabilizer pins, stabilizer bushings, and two mating stabilizer slots may be located vertically above the ISO mounts in an arrangement wherein the ISO mounts are located beneath the cooling system module. It is further contemplated that the two stabilizer pins and rubber bushings may be located on the sturdy components of the vehicle chassis instead of being located on the cooling system module, for non-limiting example attached to the frame extenders, and that the two mating slots may be incorporated into the cooling system module, for non-limiting example into the radiator frame.

Upon assembly and/or installation, the two stabilizer pins having stabilizer bushings are aligned and engaged with the two stabilizer slots, which are oriented so that the slot opens in the vertical direction, as the cooling system module is lowered onto the ISO mounts. The two stabilizer slots may be U-shaped with the U opening upwards in an arrangement wherein the two stabilizer slots are incorporated into the sturdy components of the vehicle chassis, so that the two stabilizer pins and stabilizer bushings slide vertically downwards into the stabilizer slots as the cooling system module is lowered into place. Alternately, the two stabilizer slots may not be closed at the bottom, so that the two stabilizer slots are each formed as two parallel vertical walls. In an arrangement wherein the two stabilizer pins and rubber bushings are located on the sturdy components of the vehicle chassis instead of being located on the cooling system module, and wherein the two mating slots are incorporated into the cooling system module, the two stabilizer slots may be U-shaped with the U opening oriented downwards, or the two stabilizer slots may again be formed as two parallel vertical walls. In this way, the two stabilizer slots slide down over the two stabilizer pins and stabilizer bushings as the cooling system module is lowered into place.

In any of these embodiments of the Novel Design of Stabilizers for a Vehicle Cooling Module, the two stabilizer pins, stabilizer bushings, and two mating slots are configured such that that they do not transmit any vertical load. Rather, the two stabilizer pins, stabilizer bushings, and two mating slots only function to stabilize the cooling system module, preventing the cooling system module from pivoting vertically about the cooling system module mounting points and ISO mounting rubber isolators, thereby replacing the function of the stay rods. The vertical load of the cooling system module remains supported by the cooling system module mounting points and ISO mounting rubber isolators, while the stress and vibration isolation function is accomplished by way of the stabilizer bushings. The stabilizer bushings themselves may be embodied as cylindrical bushings as described above, or may be embodied as rectangular blocks, especially in an embodiment utilizing the two stabilizer slots formed as two parallel vertical walls. To facilitate installation and assembly, the two mating slots may be provided with flared openings vertically and laterally.

Another embodiment of the Novel Design of Stabilizers for a Vehicle Cooling Module replaces the two mating slots with round holes or vertical slotted holes in the sturdy components of the vehicle chassis. The two stabilizer pins, or bolts, are then removably attached to the cooling system module, such as by way of threaded mounting blocks or weld nuts affixed to the radiator frame, for non-limiting example. Upon installation of the cooling system module into the vehicle chassis, the two stabilizer pins or bolts, with the stabilizer bushings installed over them, are then installed into the threaded mounting blocks or weld nuts. When installed, the two stabilizer pins or bolts with the stabilizer bushings installed over them extend through the round holes or vertical slotted holes in the sturdy components of the vehicle chassis. In this embodiment, the two stabilizer pins or bolts are provided with a feature such as a head to retain the stabilizer bushings.

In yet another embodiment of the Novel Design of Stabilizers for a Vehicle Cooling Module, the two stabilizer pins and stabilizer bushings are again attached to the cooling system module, for non-limiting example to the radiator frame. Two mating slots are again incorporated into sturdy components of the vehicle chassis, for non-limiting example formed into the frame extenders. Upon assembly and/or installation, the two stabilizer pins having stabilizer bushings are again aligned and engaged with the two stabilizer slots, which are again oriented so that the slot opens in the vertical direction, as the cooling system module is lowered onto the ISO mounts. In order to allow for the stabilizer bushings to be replaced at the end of their useful life, the two stabilizer pins are also removably attached to the cooling system module, such as by way of threaded mounting blocks or weld nuts affixed to the radiator frame, for non-limiting example. The sturdy components of the vehicle chassis, for non-limiting example the frame extenders, are further provided with holes in the centers of the two stabilizer slots.

In this way, when the stabilizer bushings are to be replaced, the two stabilizer pins are removed from the threaded mounting blocks or weld nuts using a tool extending through the holes in the center of the two stabilizer slots, for non-limiting example a hex key that engages with hex key holes in the ends of the two stabilizer pins. The two stabilizer pins are then withdrawn through the holes in the center of the two stabilizer slots, and the stabilizer bushings are removed vertically through the open ends of the two stabilizer slots, without necessitating the removal of the cooling system module. When installed, the two stabilizer pins are recessed within the distal ends of the stabilizer bushings, in order to prevent interference with the two stabilizer slots or the sturdy components of the vehicle chassis, for non-limiting example the frame extenders.

Turning now to FIG. 1, a vehicle 10 having a chassis 12 configured with two frame rails 14 joined by cross members 18 is shown. At the forward end of the two frame rails 14, frame extenders 16 are provided, which provide space to accommodate a cooling system module 20 including a radiator and/or heat exchanger 22, as well as providing mounting for various vehicle components, including the cooling system module 20. Stay rods 34 connect the cooling system module 20 to a cross member 18 of the chassis 12, thereby stabilizing the cooling system module 20 and preventing it from pivoting about its mounting points.

Figure 2:
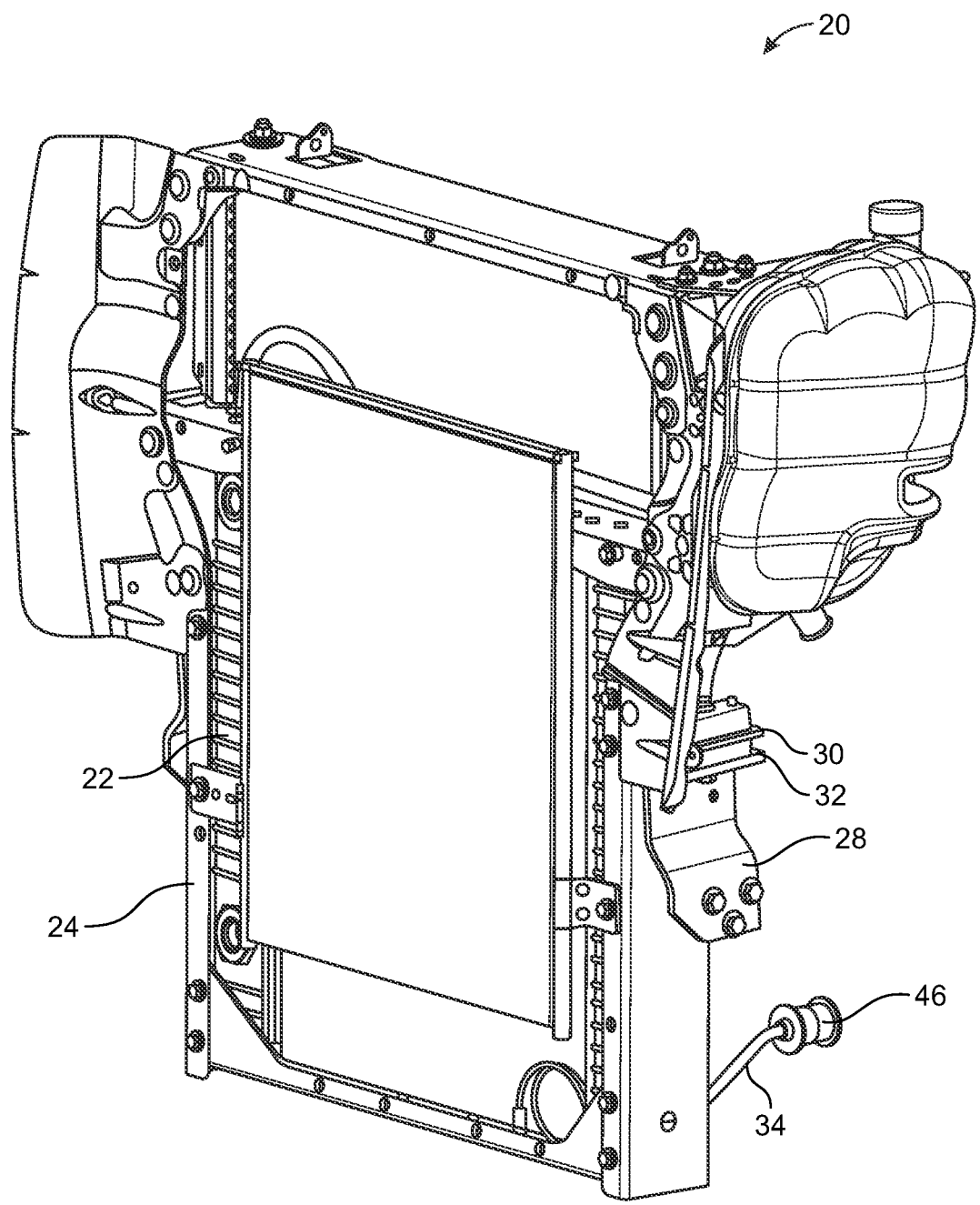
FIG. 2 is a front left perspective view of a known vehicle cooling system module, as described herein.
Figure 3:
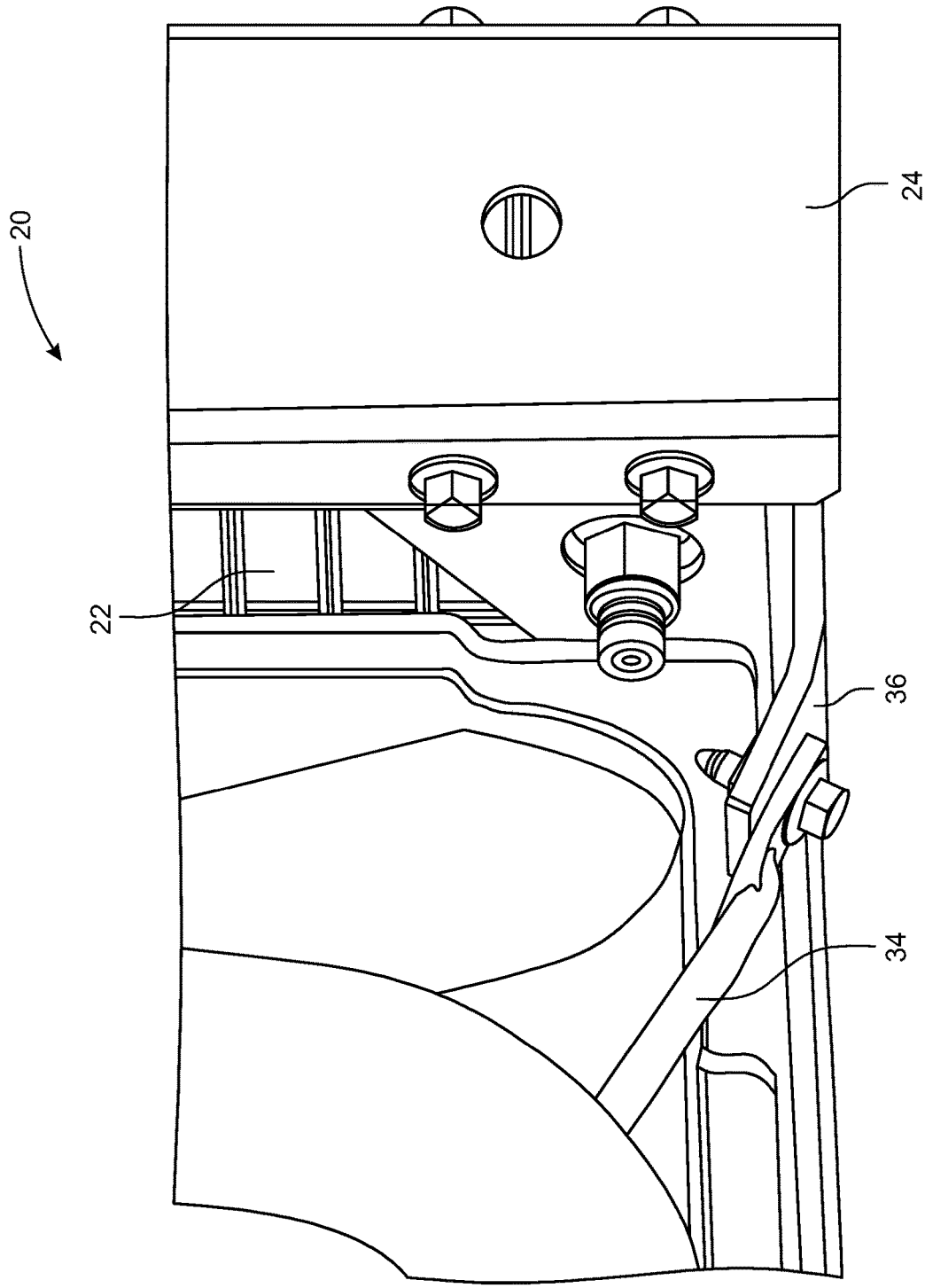
FIG. 3 is a partial rear right perspective view of a known vehicle cooling system module installed in a vehicle chassis, as described herein.
Figure 4:
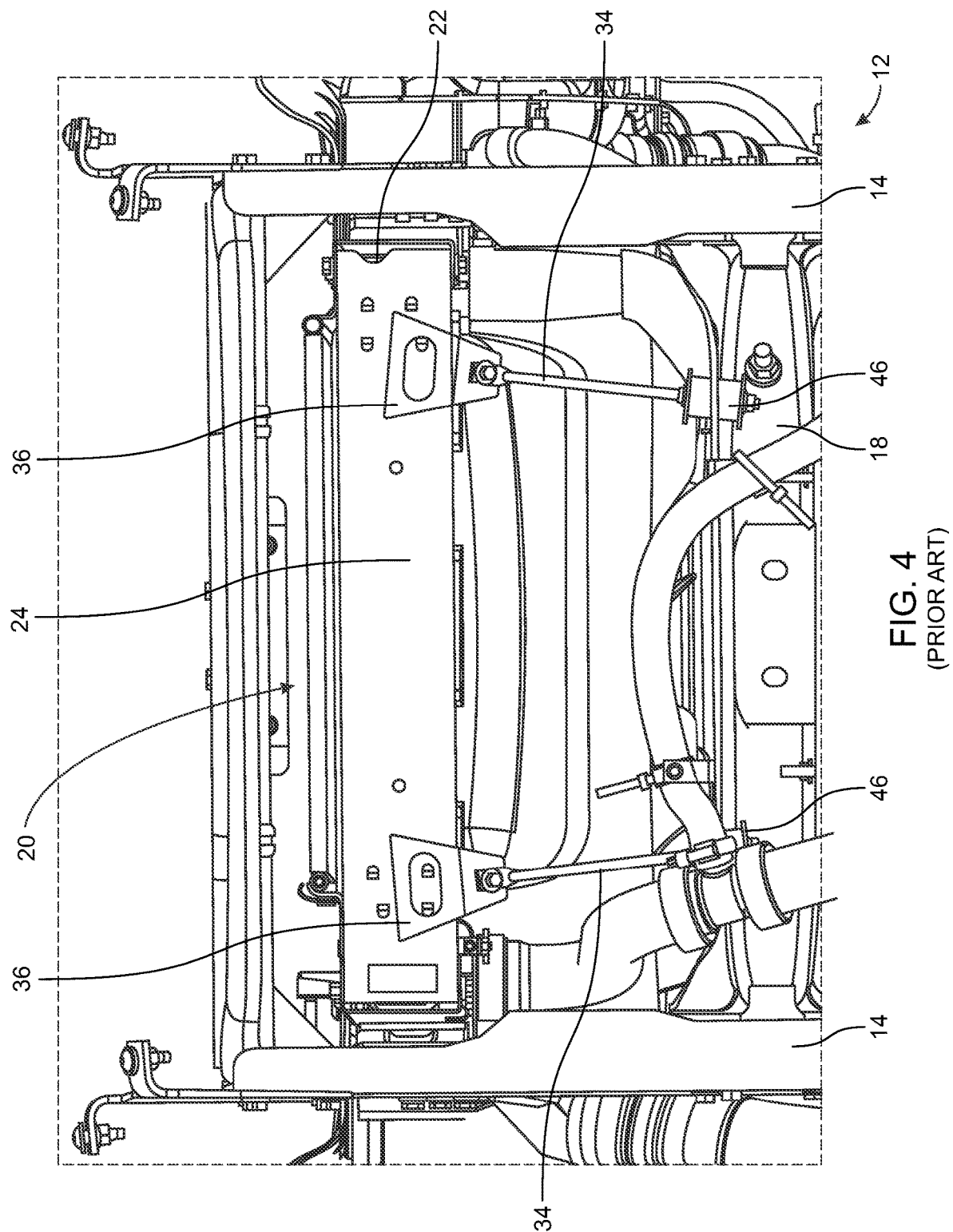
FIG. 4 is a partial bottom view of a known vehicle cooling system module installed in a vehicle chassis, as described herein.
Figure 5:
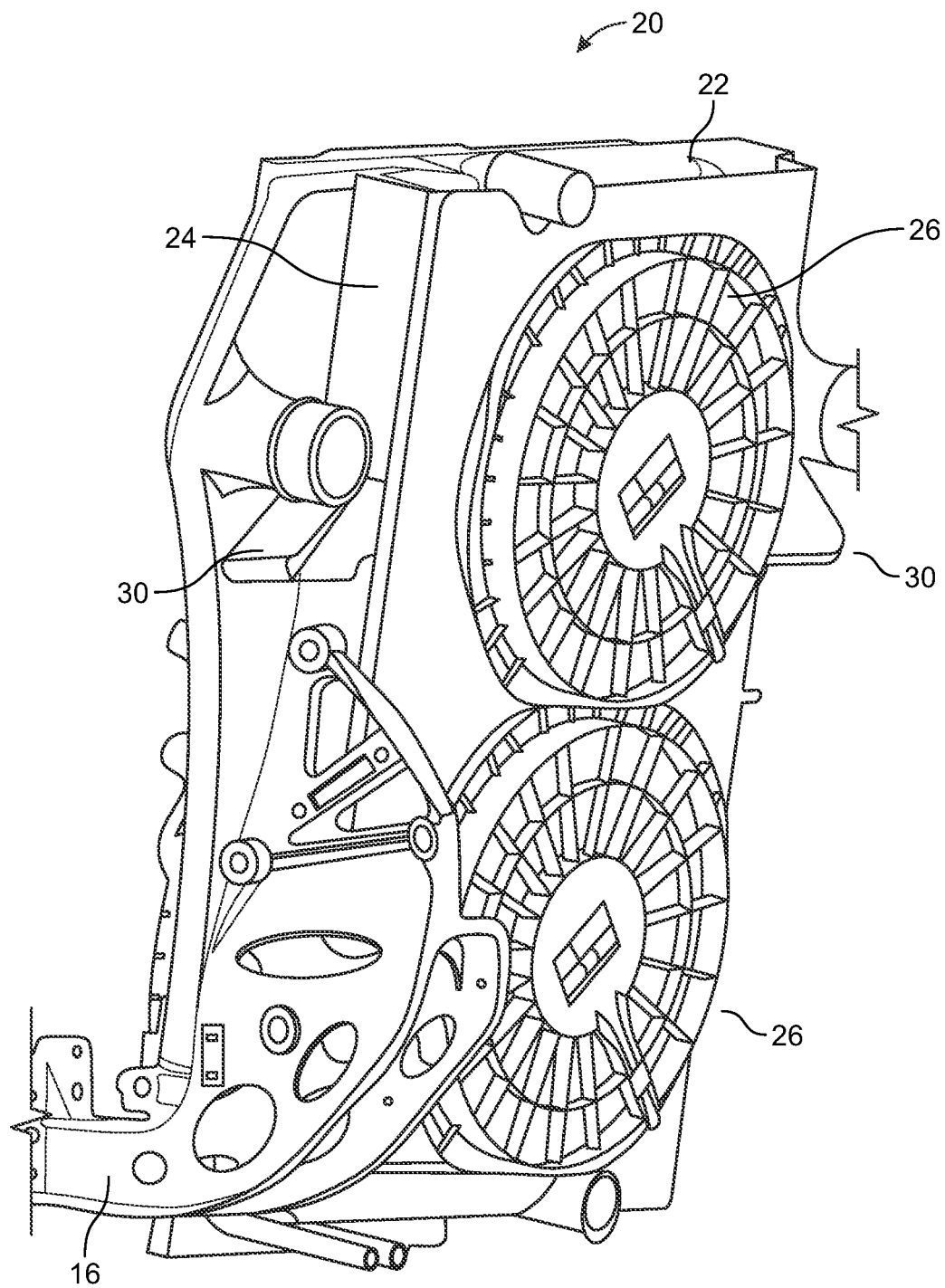
FIG. 5 is a partial left rear perspective view of a known vehicle cooling system module and frame extender, as described herein.
Figure 6:
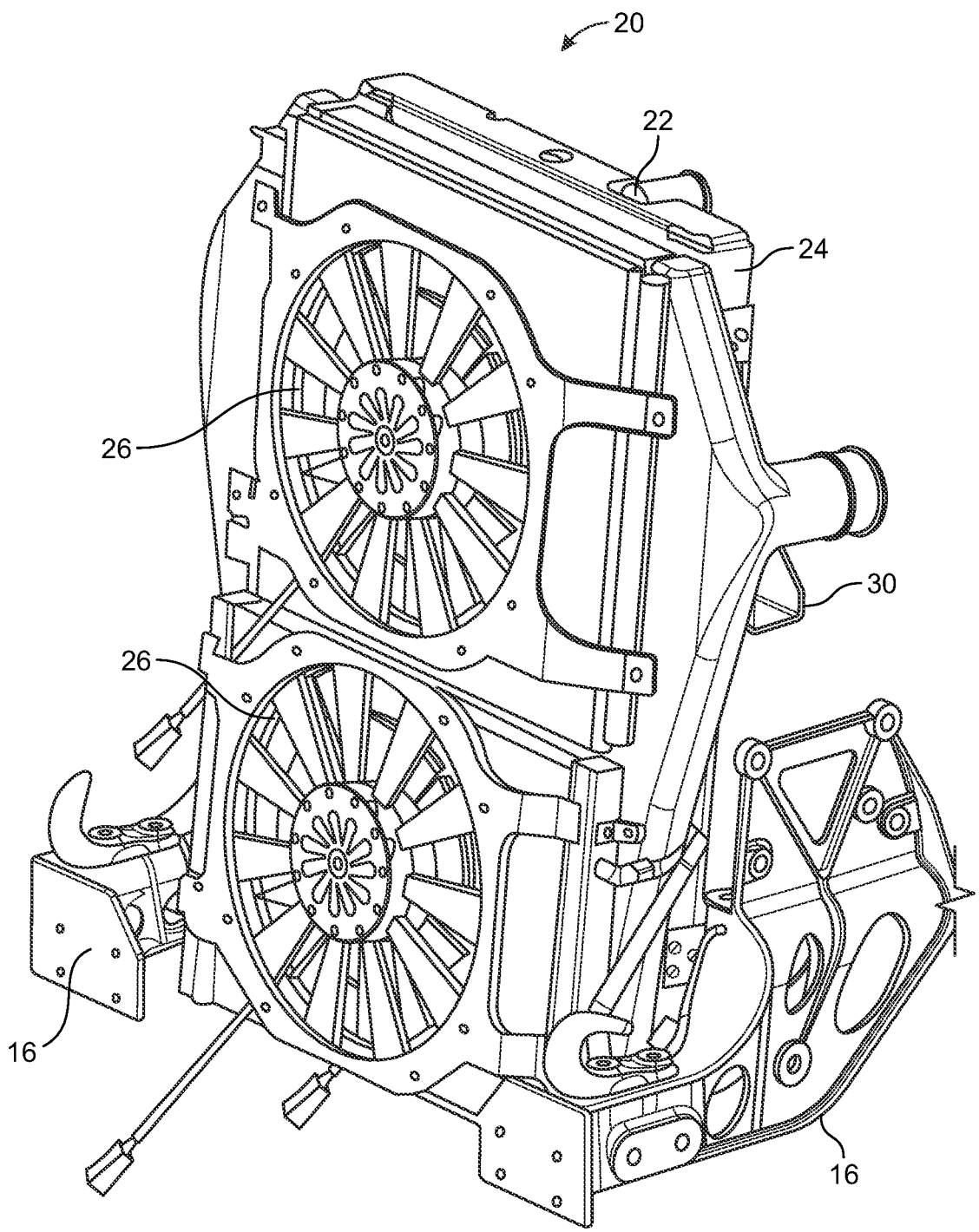
FIG. 6 is a partial left front perspective view of a known vehicle cooling system module and frame extender2, as described herein.
Figure 7:
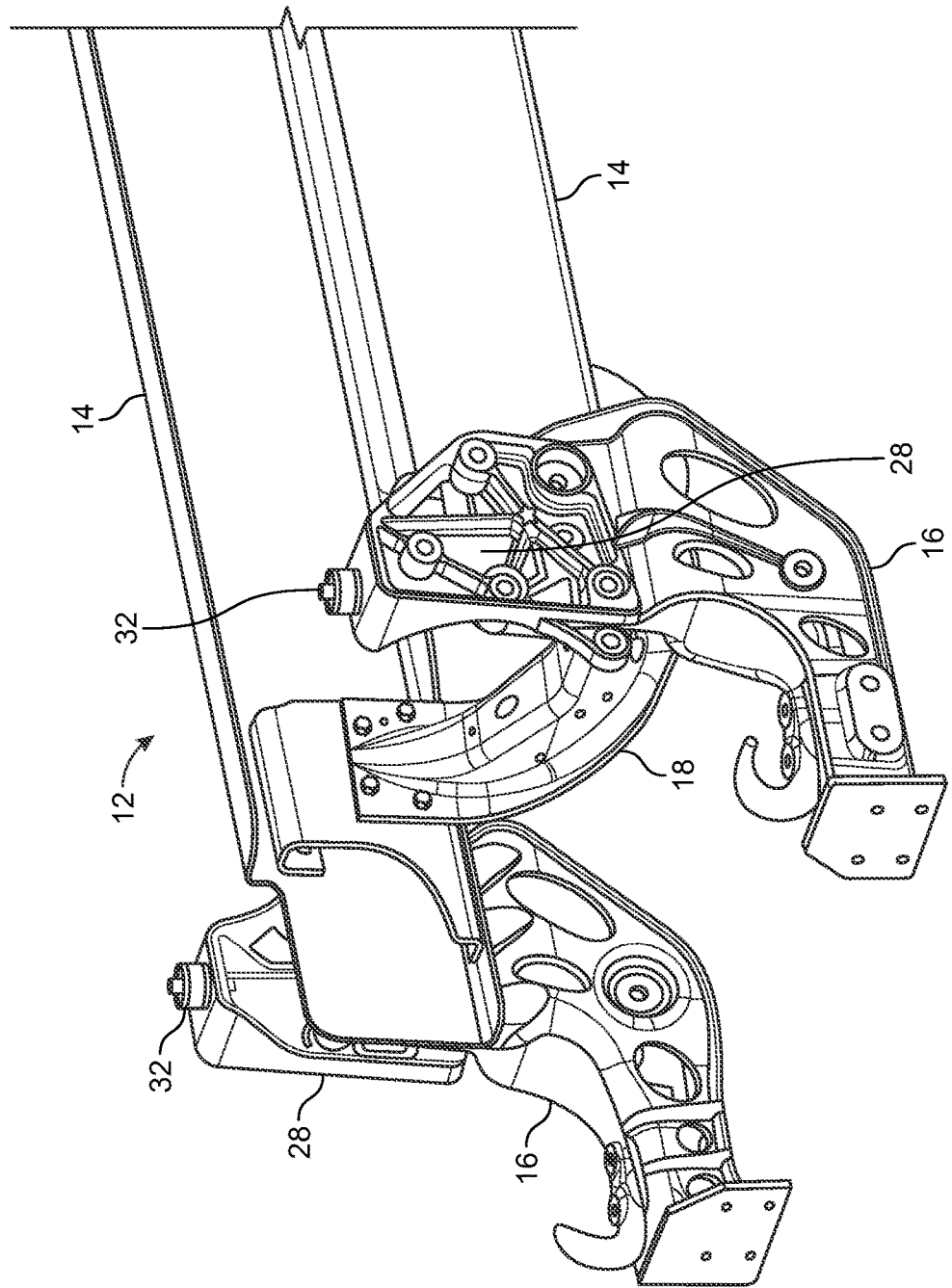
FIG. 7 is a partial left front perspective view of a known vehicle chassis and frame extenders, as described herein.
Figure 8:
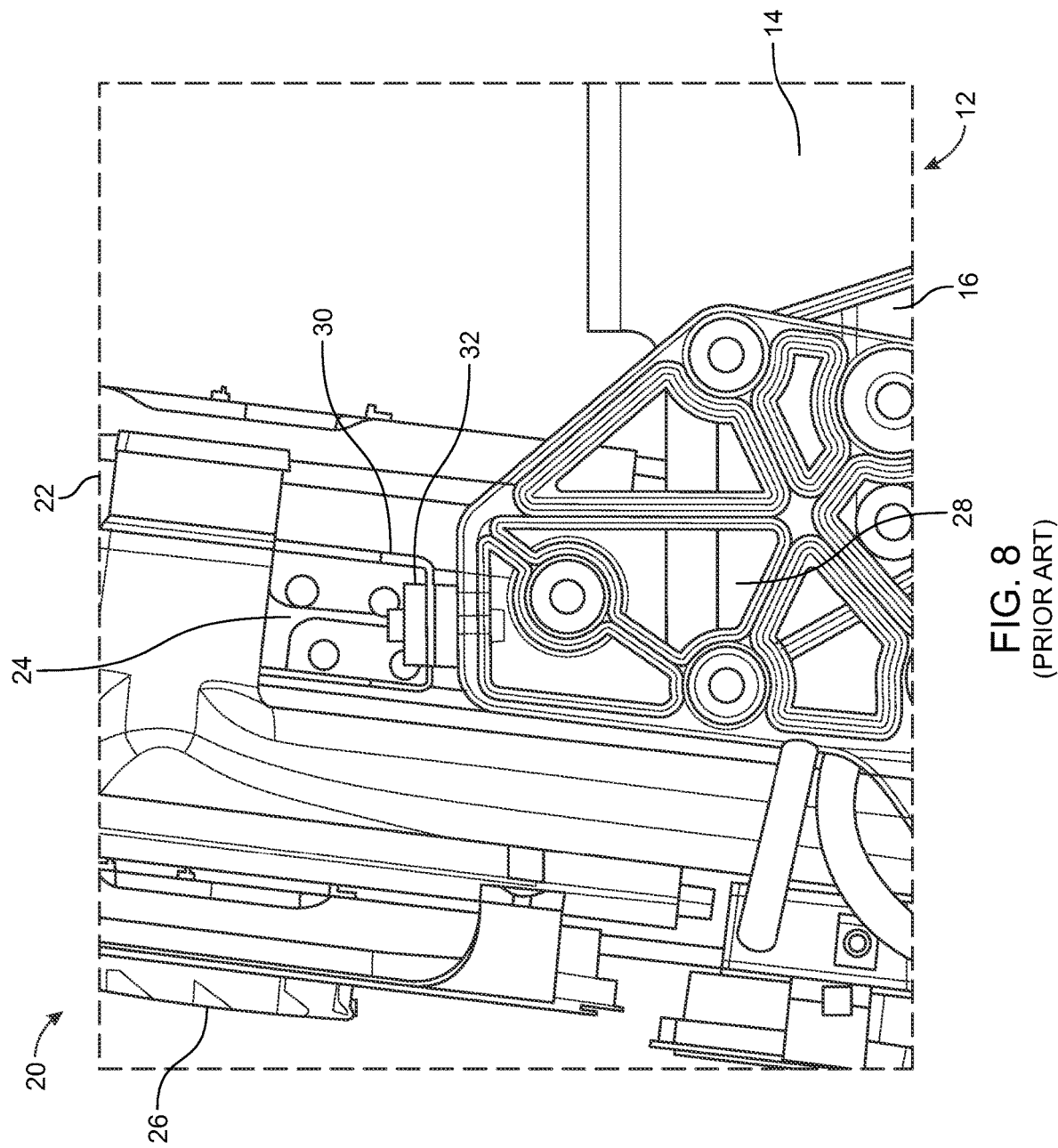
FIG. 8 is a partial left side view of a known vehicle cooling system module installed in a vehicle chassis, as described herein.
Figure 9:
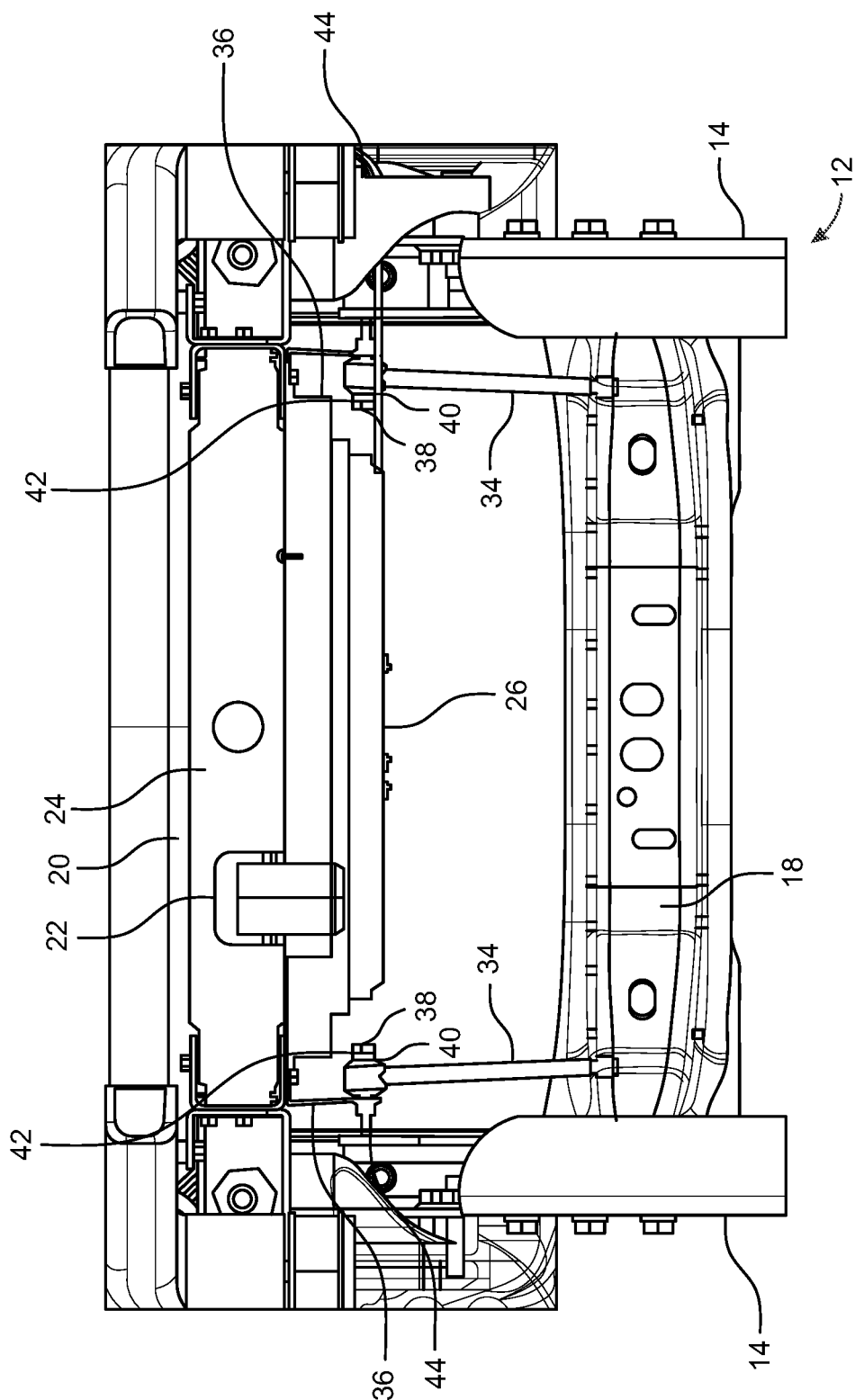
FIG. 9 is a partial top view of a known vehicle cooling system module installed in a vehicle chassis, as described herein.
Figure 10:
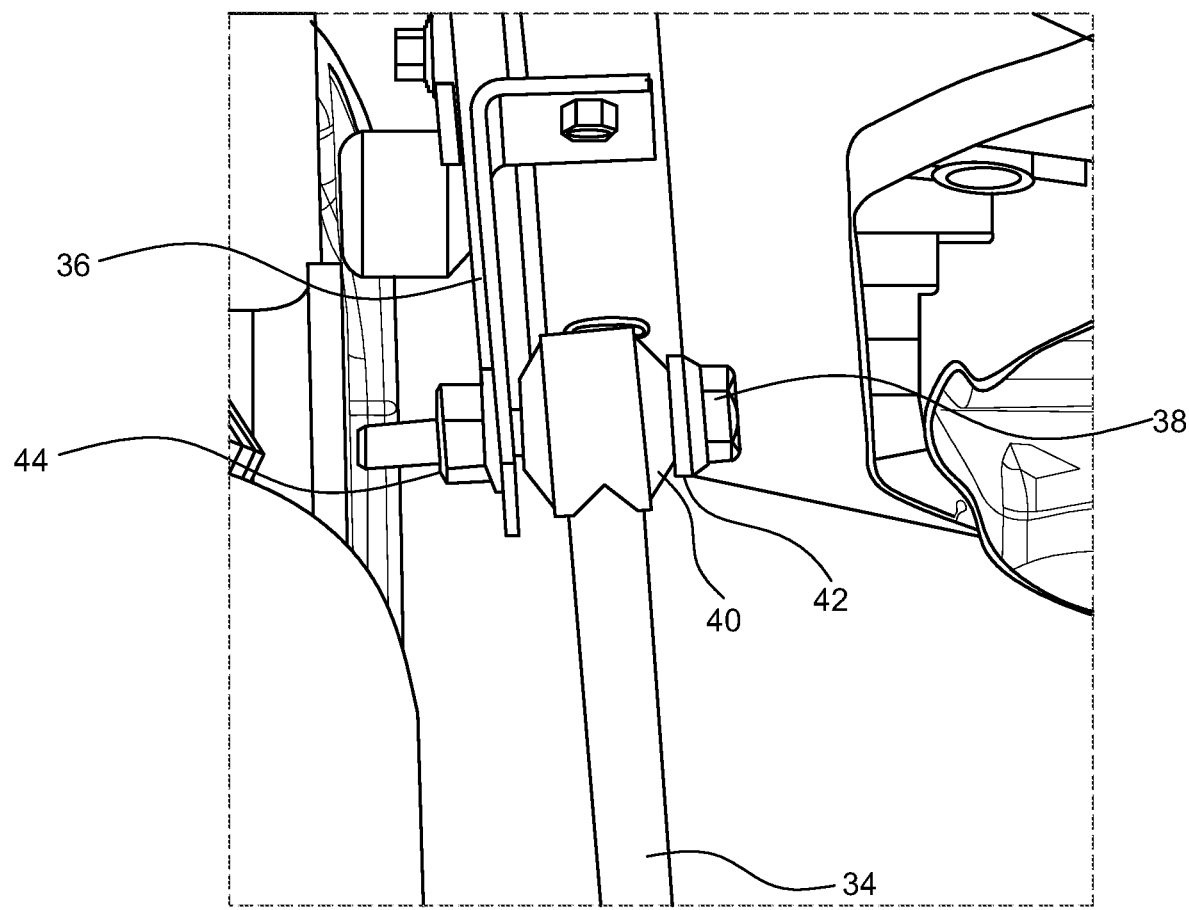
FIG. 10 is a partial top detail view of a known vehicle cooling system module installed in a vehicle chassis, as described herein.
Figure 11:
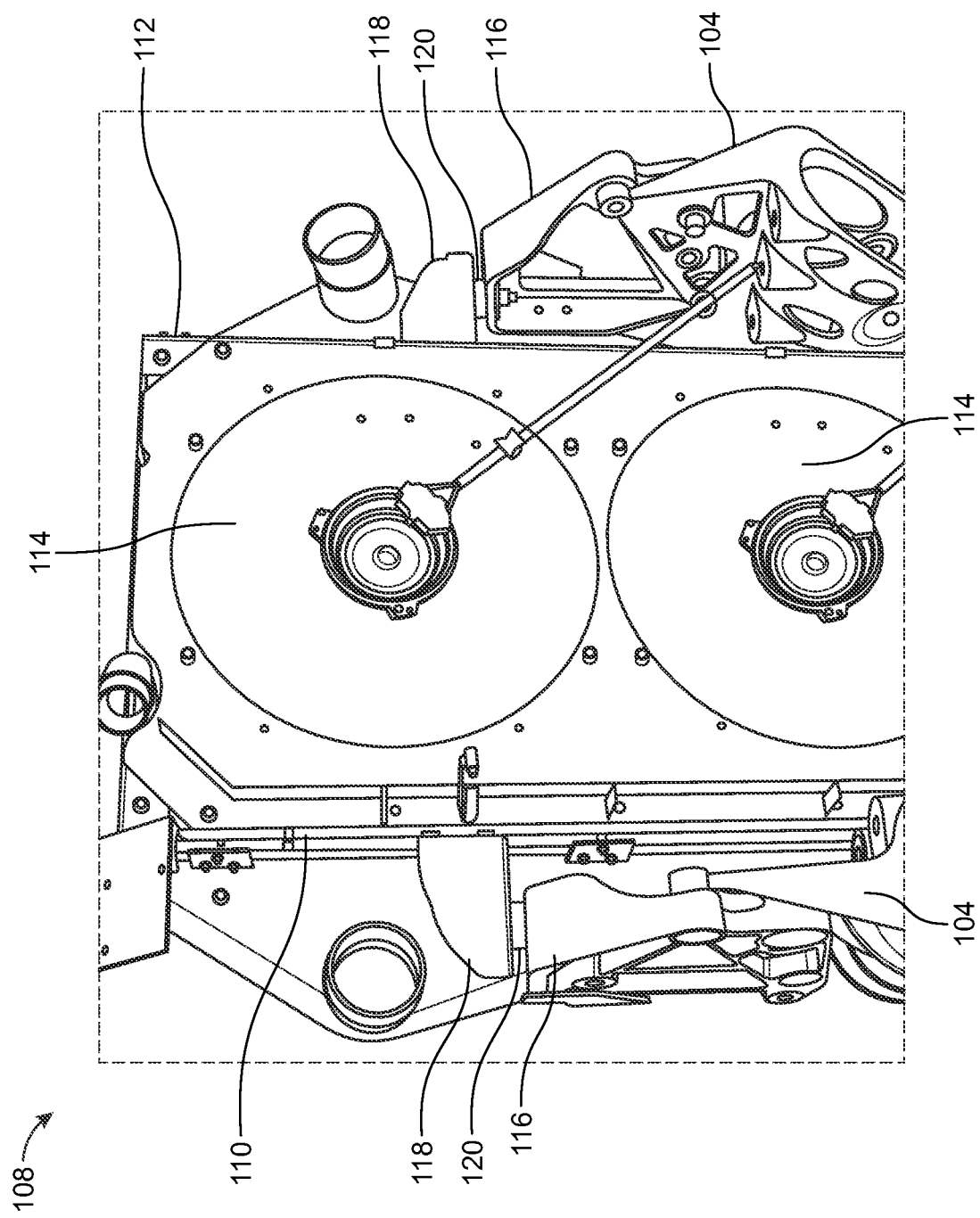
FIG. 11 is a partial front right perspective view of an embodiment of the Novel Design of Stabilizers for a Vehicle Cooling Module, as described herein.
Figure 12:
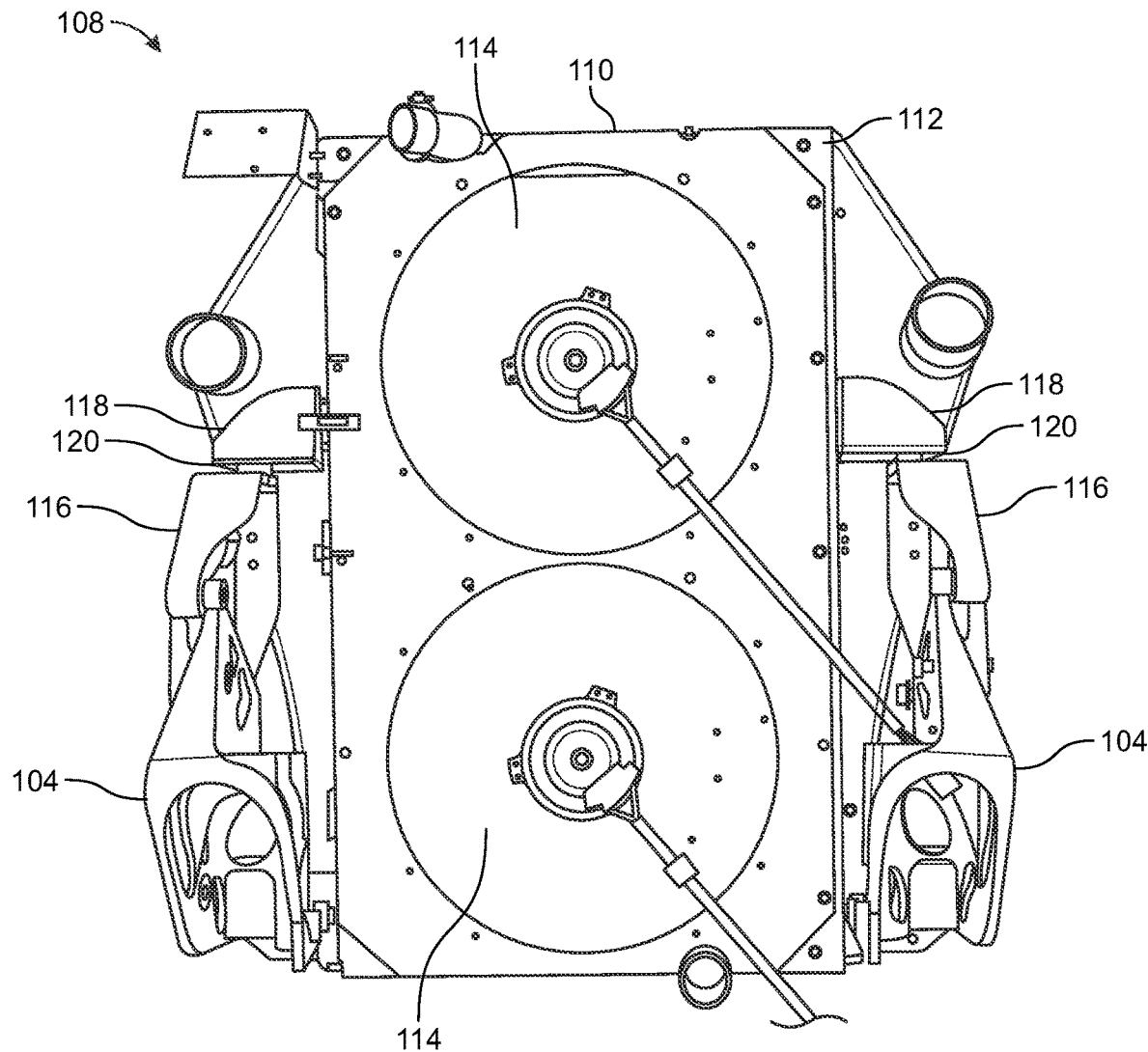
FIG. 12 is a partial front view of an embodiment of the Novel Design of Stabilizers for a Vehicle Cooling Module, as described herein.
Figure 13:
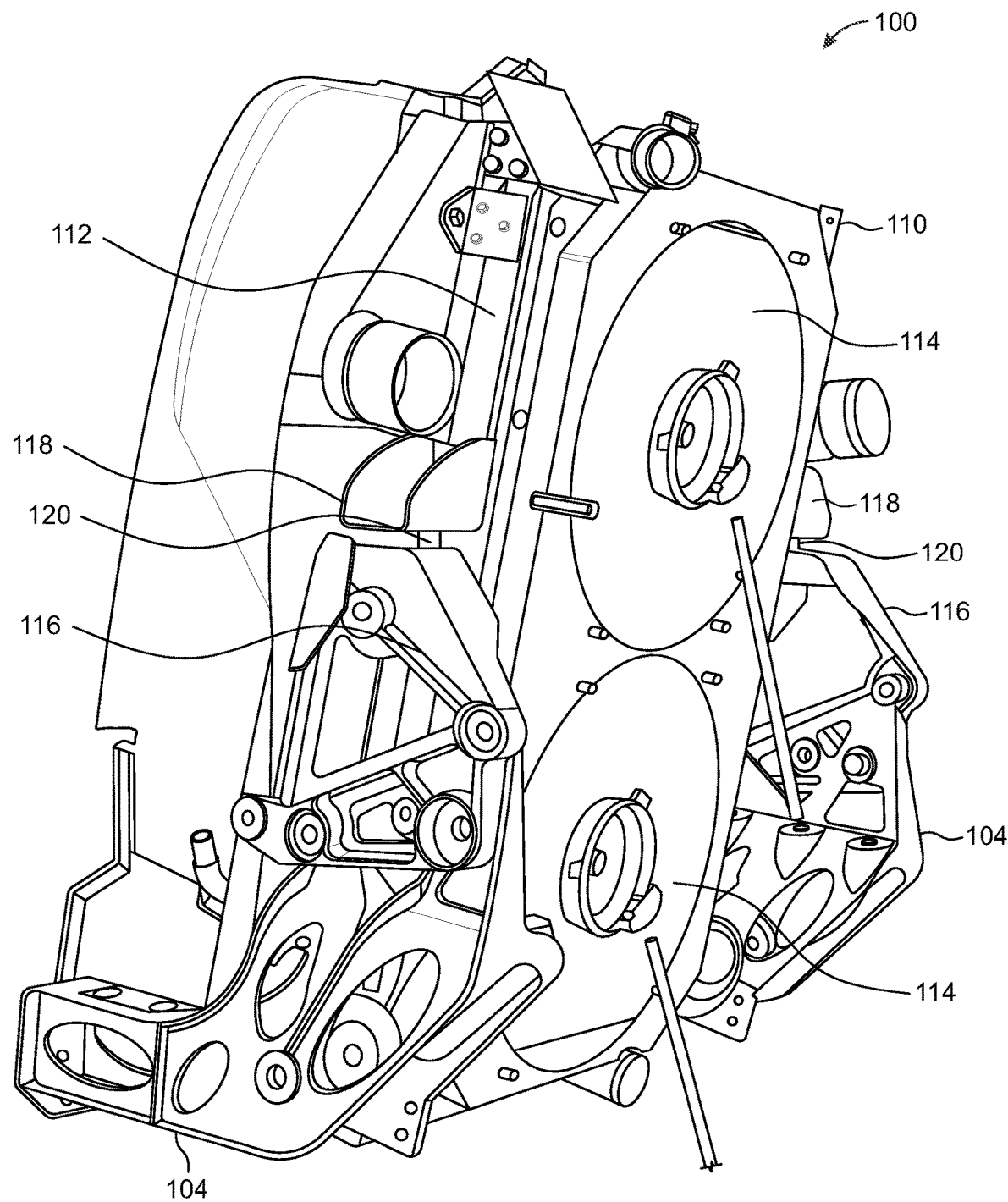
FIG. 13 is a partial rear left perspective view of an embodiment of the Novel Design of Stabilizers for a Vehicle Cooling Module, as described herein.
Figure 14:
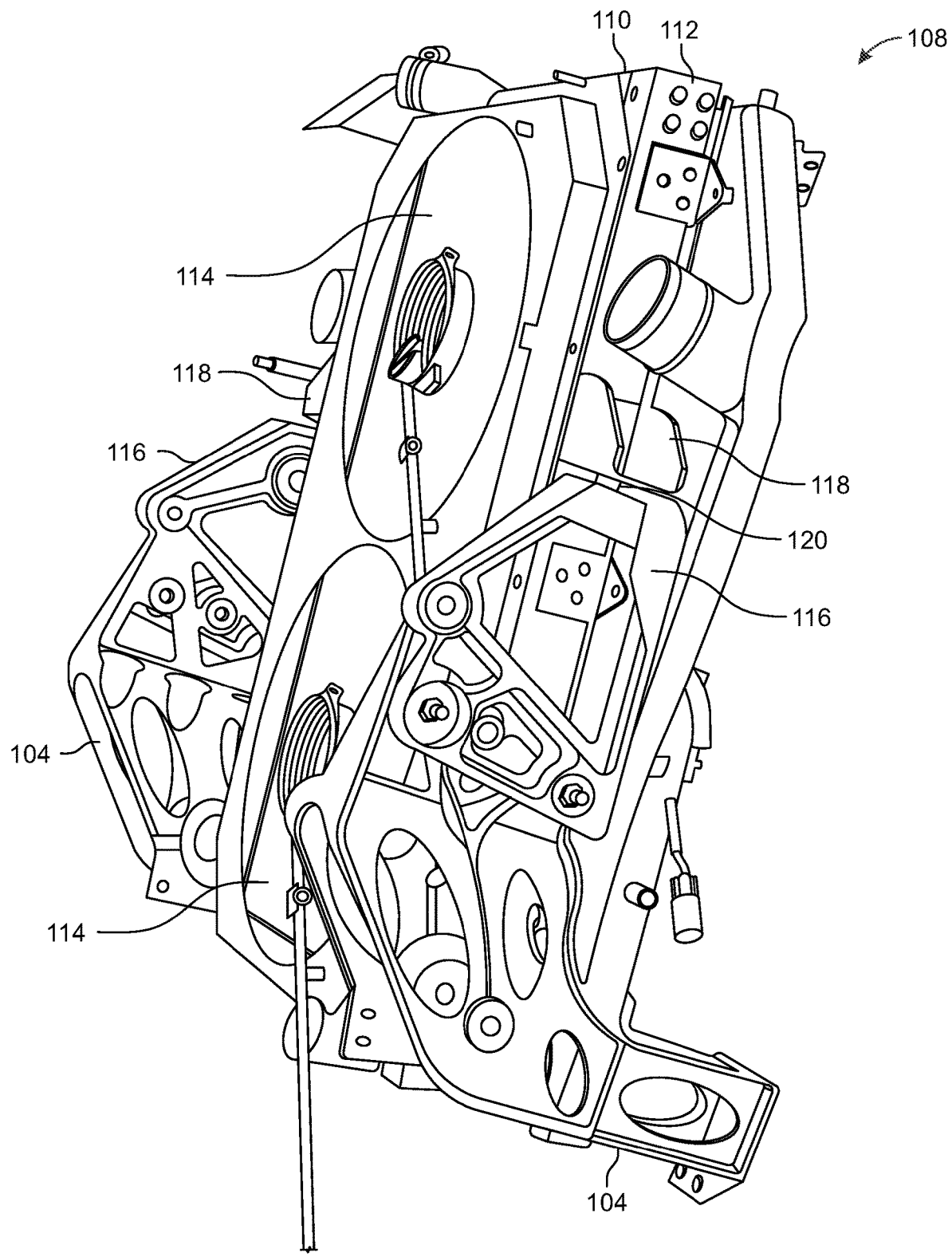
FIG. 14 is a partial rear right perspective view of an embodiment of the Novel Design of Stabilizers for a Vehicle Cooling Module, as described herein.
Figure 15:
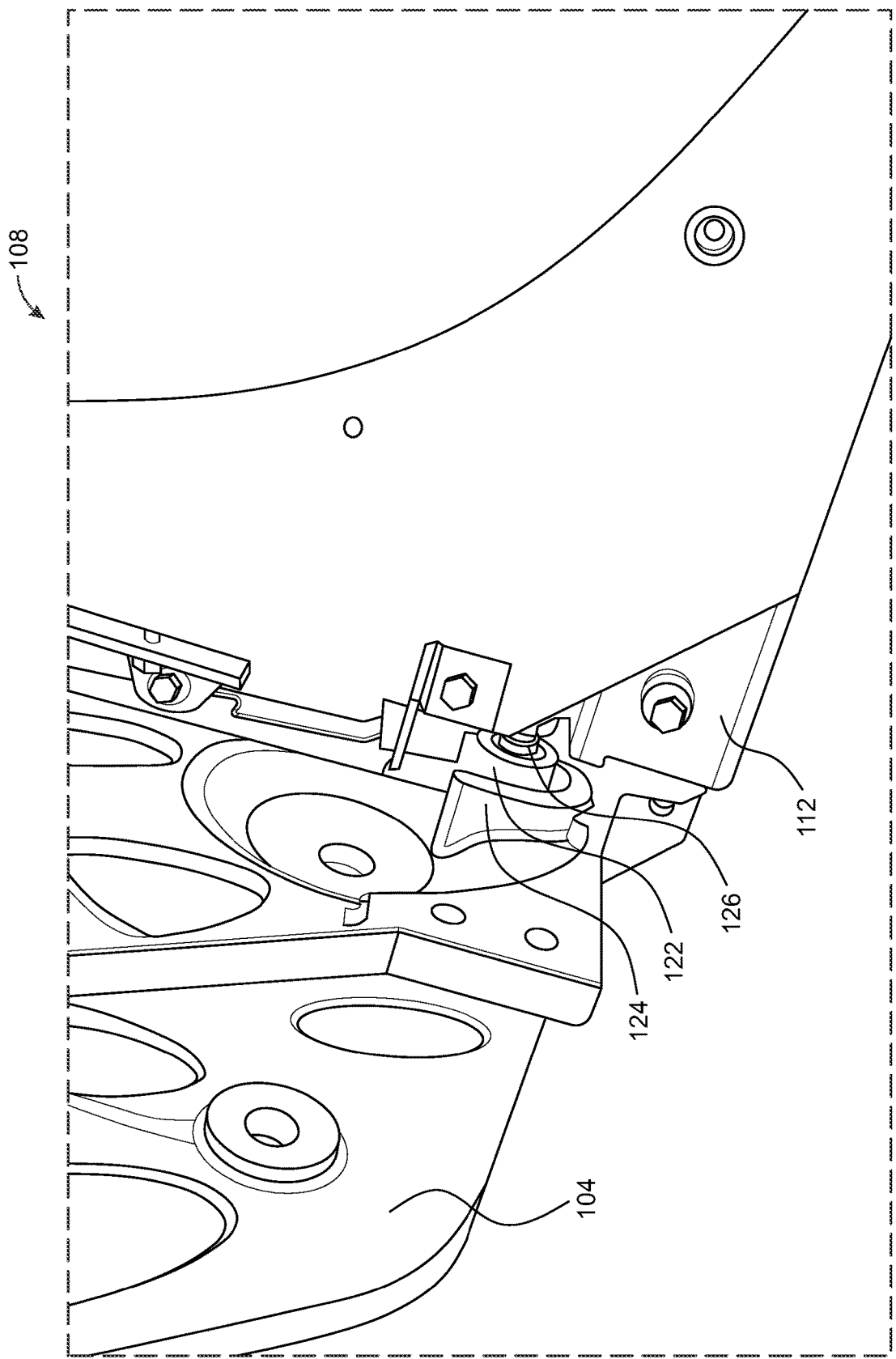
FIG. 15 is a partial rear perspective detail view of an embodiment of the Novel Design of Stabilizers for a Vehicle Cooling Module, as described herein.
Figure 16:
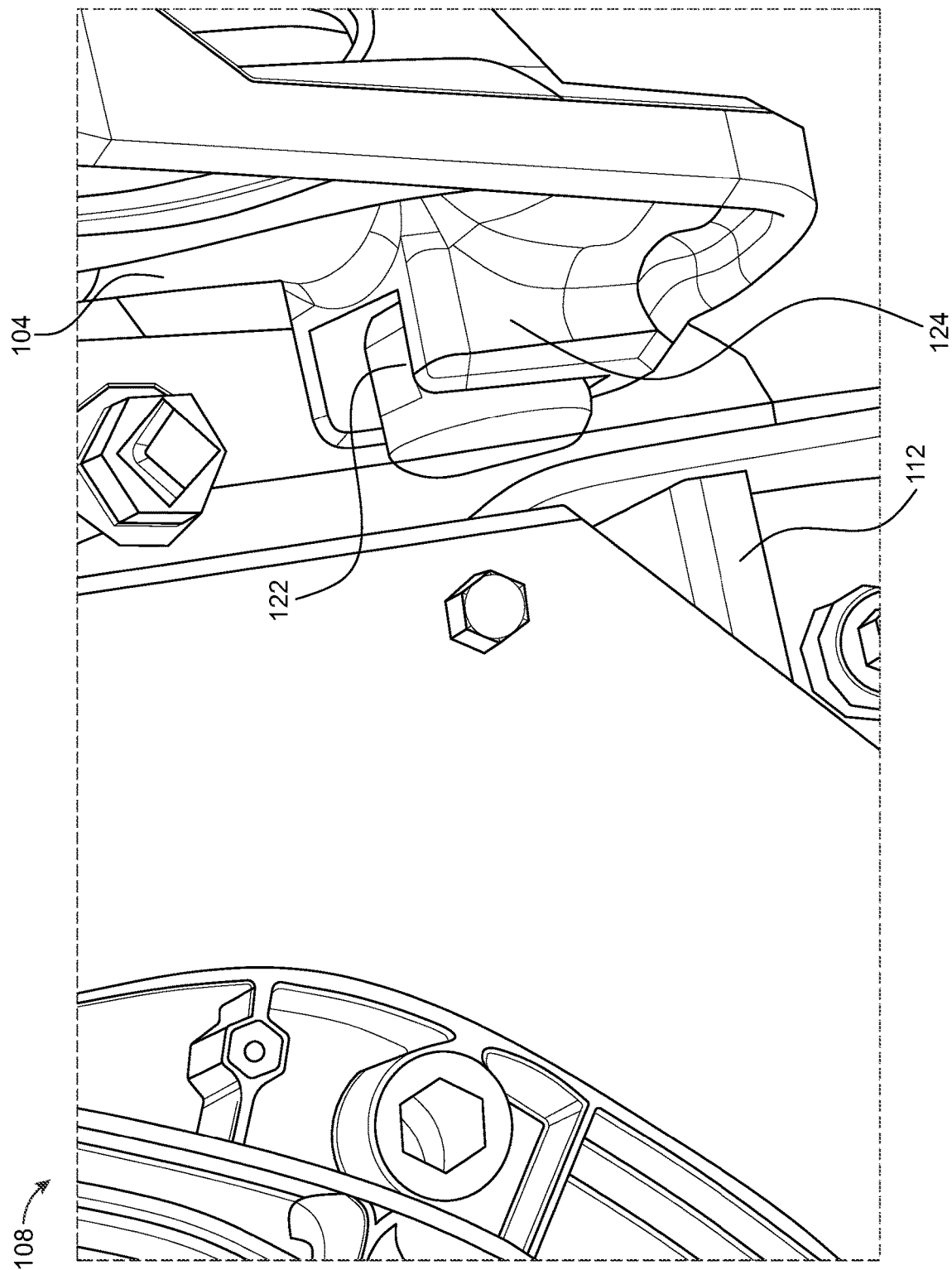
FIGS. 16 and 17 are partial top rear perspective detail views of an embodiment of the Novel Design of Stabilizers for a Vehicle Cooling Module, as described herein.
Figure 17:
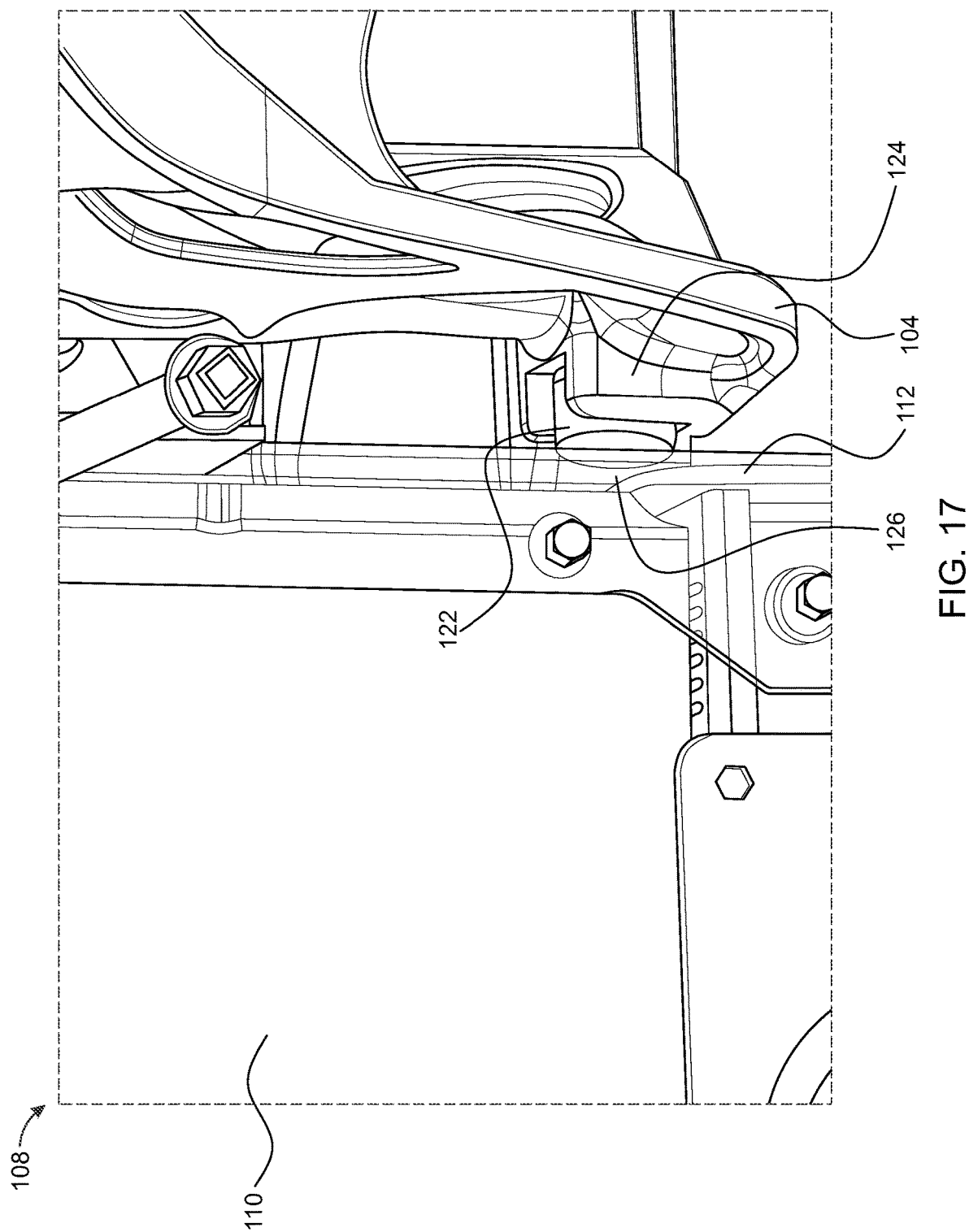
Figure 18:
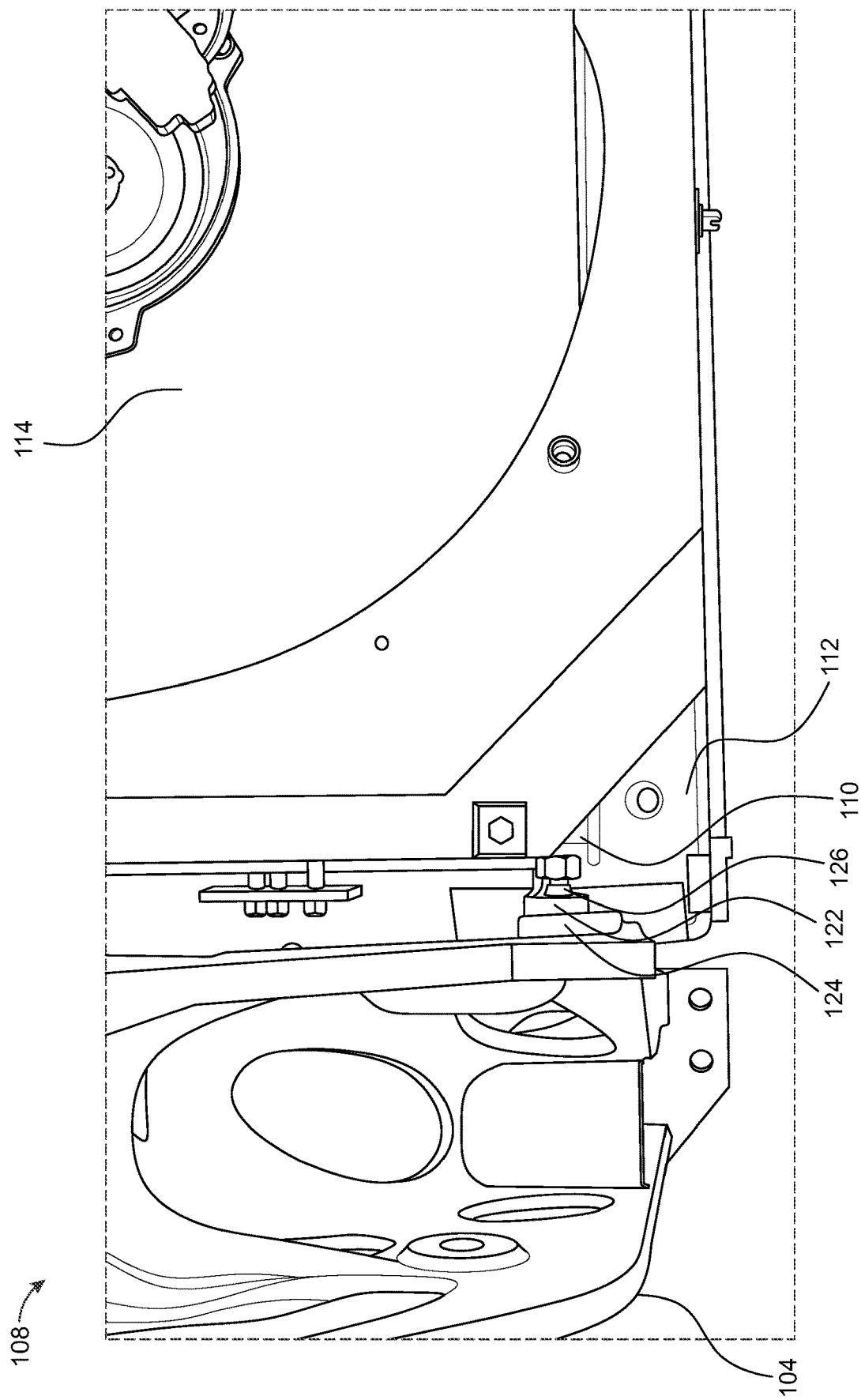
FIG. 18 is a partial rear perspective detail view of an embodiment of the Novel Design of Stabilizers for a Vehicle Cooling Module, as described herein.

Turning now to FIGS. 2 through 4, a known cooling system module 20 mounting arrangement is shown. The cooling system module 20 includes a radiator and/or heat exchanger 22, and is mounted, in this case, to the frame rails 14 of the chassis 12 of a vehicle by way of cooling system module main supports 28, ISO mounting rubber isolators 32, and cooling system module mounting points 30. The cooling system module mounting points 30 are, in this case, attached to the radiator frame 24 of the cooling system module 20. Stay rods 34 are also attached to the radiator frame 24 of the cooling system module 20 by way of stay rod to cooling system mounting brackets 36. The distal ends of the stay rods 34 are then attached to the foremost cross member 18 by way of stay rod isolators 46, which perform the necessary stress and vibration isolating function. As noted previously, connecting the stay rods 34 to the cooling system module 20 and to the vehicle cross member 18 is time consuming and labor intensive during the manufacturing process, and the stay rods 34 further obstruct access to the space between the cooling system module 20 and the front of the engine (not shown).

Turning now to FIGS. 5 through 10, another known cooling system module 20 mounting arrangement is shown. The cooling system module 20 again includes a radiator and/or heat exchanger 22 and engine fan(s) 26, and is mounted, in this case, to the frame extender 16, which is in turn attached to frame rails 14 of the chassis 12. The cooling system module 20 is mounted to the frame extender 16 by way of cooling system module main supports 28, ISO mounting rubber isolators 32, and cooling system module mounting points 30. The cooling system module mounting points 30 are again attached to the radiator frame 24 of the cooling system module 20. Stay rods 34 are again attached to the radiator frame 24 of the cooling system module 20 by way of stay rod to cooling system mounting brackets 36. The distal ends of the stay rods 34 are again attached to the foremost cross member 18 by way of stay rod isolators 46, whereas in this case, the proximal ends of the stay rods 34 are attached to the stay rod to cooling system mounting brackets 36 using stay rod bolts 38, stay rod rubber bushings 40, washers 42, and nuts 44. This known arrangement again illustrates how connecting the stay rods 34 to the cooling system module 20 and to the vehicle cross member 18 is time consuming and labor intensive during the manufacturing process, and how the stay rods 34 further obstruct access to the space between the cooling system module 20 and the front of the engine (not shown).

Turning now to FIGS. 11 through 18 an illustrative non-limiting embodiment of the Novel Design of Stabilizers for a Vehicle Cooling Module is shown. A cooling system module 108 includes a radiator and/or heat exchanger 110 and engine fan(s) 114, and is mounted to the frame extender 104, which is in turn attached to frame rails (not shown) of the chassis 100. The cooling system module 108 is mounted to the frame extender 104 by way of cooling system module main supports 116, ISO mounting rubber isolators 120, and cooling system module mounting points 118. It is also contemplated that the cooling system module 108 may be otherwise mounted, such directly to the frame rails or to a cross member (not shown) by way of suitable ISO mounting rubber isolators. In the present embodiment, the cooling system module mounting points 118 are attached to the radiator frame 112 of the cooling system module 108.

Two stabilizer pins 126 are attached to the cooling system module 108 at or near the bottom of the cooling system module 108, beneath the cooling system module main supports 116 and cooling system module mounting points 118. However, it is further contemplated that the two stabilizer pins 126 may be attached to the cooling system module 108 at or near the top of the cooling system module 108, above the cooling system module main supports 116 and cooling system module mounting points 118, especially if such cooling system module main supports 116 and cooling system module mounting points 118 are located at the bottom of the cooling system module 108. In the present embodiment, the two stabilizer pins 126 are attached to the cooling system module 108 by way of the radiator frame 112. Stabilizer bushings 122 are affixed over the two stabilizer pins 126.

Two stabilizer slots 124 are incorporated into the frame extender 104, for non-limiting example, although it is contemplated that the two stabilizer slots 124 may be incorporated into another sturdy component of the vehicle chassis (not shown). In an embodiment wherein the two stabilizer pins 126 are attached to the cooling system module 108 at or near the top of the cooling system module 108, it follows that the two stabilizer slots 124 would be incorporated into a sturdy component of the vehicle located at the height of the two stabilizer pins 126. In the present embodiment, the two stabilizer pins 126 having stabilizer bushings 122 are aligned and engaged with the two stabilizer slots 124, which are oriented so that the slot opens in the vertical direction. In this way, as the cooling system module 108 is lowered onto the ISO mounting rubber isolators 120, the two stabilizer pins 126 and stabilizer bushings 122 slide vertically downwards into the stabilizer slots 124.

As may be seen especially in FIGS. 15 through 18, in the installed position of the cooling system module 108, the two stabilizer pins 126 having stabilizer bushings 122 do not rest against the bottom of the U-shaped stabilizer slots 124. In this way, as noted previously, the two stabilizer pins 126, stabilizer bushings 122, and two stabilizer slots 124 are configured such that that they do not transmit any vertical load and only function to stabilize the cooling system module 108, thereby preventing the cooling system module 108 from pivoting vertically about the cooling system module mounting points 118 and ISO mounting rubber isolators 120.

Figure 19:
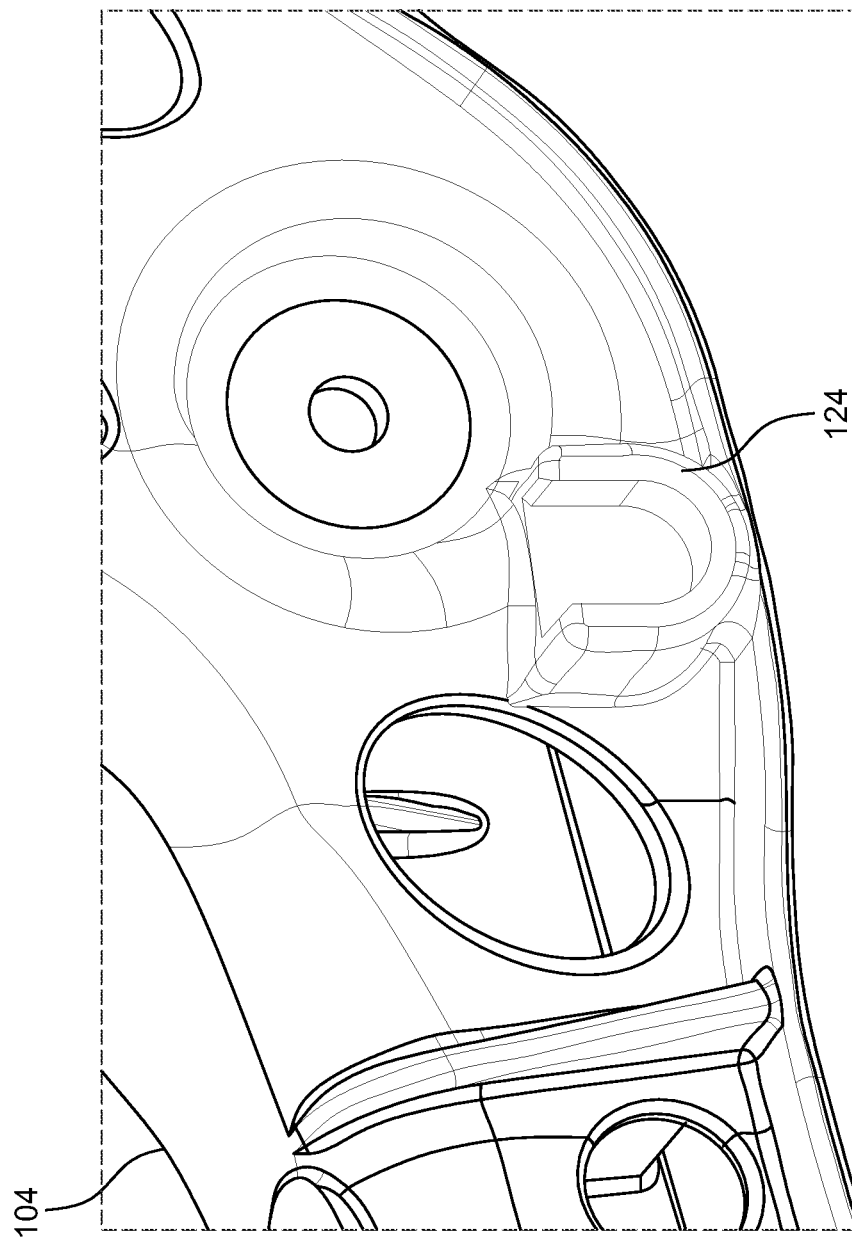
FIG. 19 is a partial top left hand perspective detail view of a frame extender and stabilizer slot of an embodiment of the Novel Design of Stabilizers for a Vehicle Cooling Module, as described herein.
Figure 20:
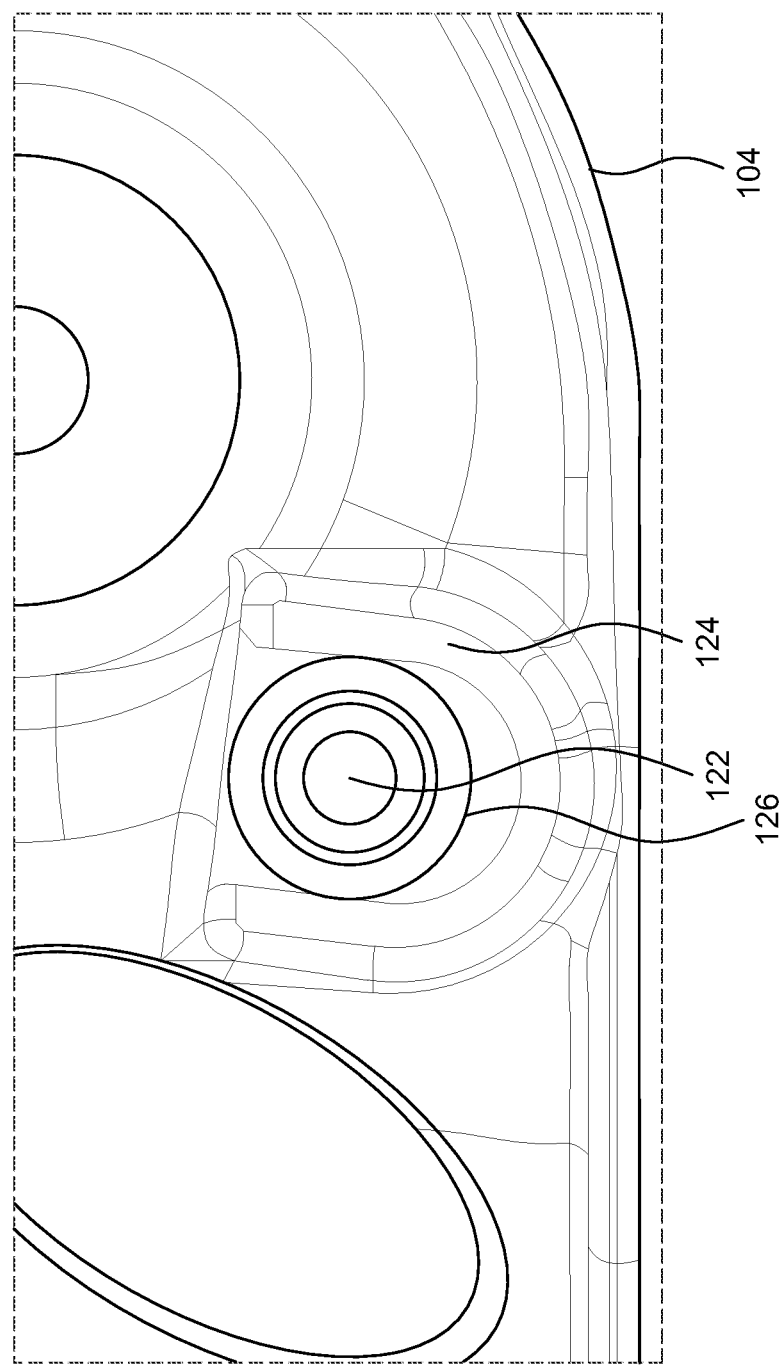
FIG. 20 is a partial left hand detail view of a frame extender, stabilizer slot, and stabilizer bushing of an embodiment of the Novel Design of Stabilizers for a Vehicle Cooling Module, as described herein.
Figure 21:
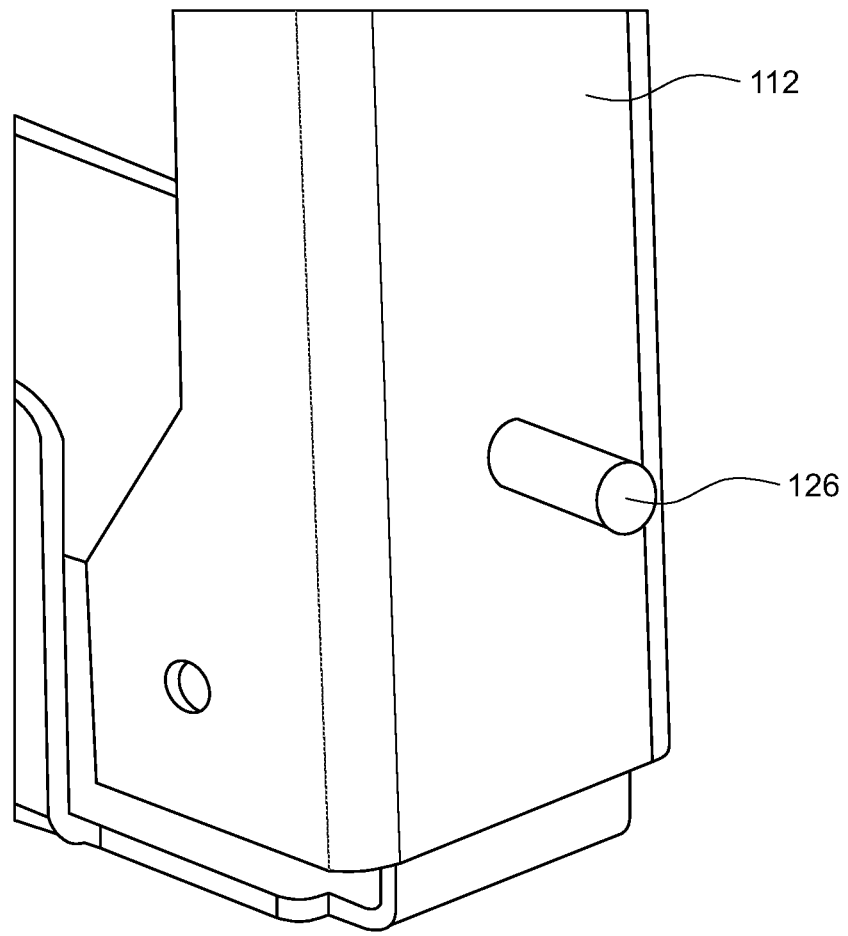
FIG. 21 is a partial top right hand perspective detail view of a stabilizer pin of an embodiment of the Novel Design of Stabilizers for a Vehicle Cooling Module, as described herein.

Turning now to FIGS. 19 and 20 partial detail views are shown of a frame extender 104 of an embodiment of the Novel Design of Stabilizers for a Vehicle Cooling Module. A stabilizer slot 124 is incorporated in the frame extender 104, in the present non-limiting exemplary embodiment being cast directly into the frame extender 104 itself. The stabilizer slot 124 is formed as a U-shape with the opening oriented vertically upwards. It is further contemplated that the stabilizer slot 124 may be formed with no bottom, so that it is then a pair of vertically oriented parallel walls. Still alternately, the stabilizer slot 124 may have a squared bottom, in which case the stabilizer bushing 122 may be formed as a square block of rubber, rather than a round bushing. As shown in FIG. 20, the stabilizer pin 126 and stabilizer bushing 122 extends laterally into the stabilizer slot 124, but does not rest against the bottom, so that the stabilizer pin 126 only stabilizes the cooling system module (not shown) against rotating about its mountings, and so that no vertical support is provided by the stabilizer slot 124, stabilizer bushing 122, and stabilizer pin 126. FIG. 21 shows the stabilizer pin 126 attached to the radiator frame 112 of the radiator (not shown) of the cooling system module.

Figure 22:
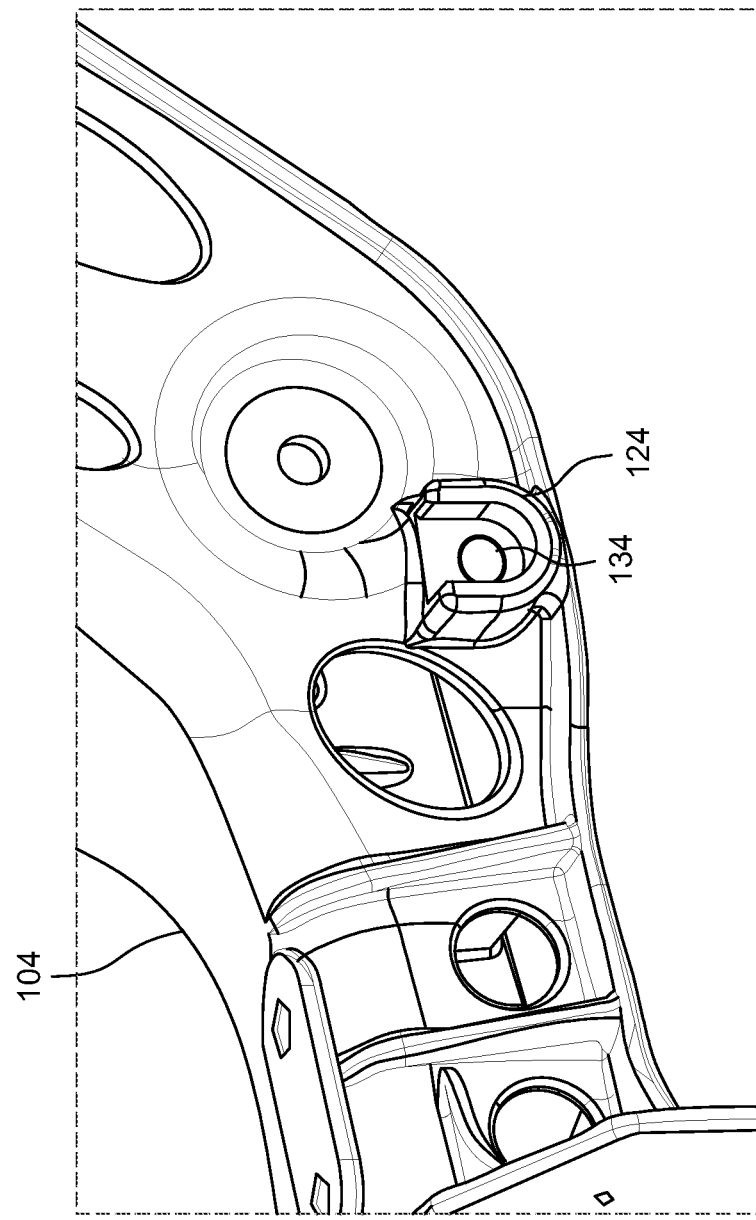
FIG. 22 is a section view of a stabilizer bushing and stabilizer pin of an embodiment of the Novel Design of Stabilizers for a Vehicle Cooling Module, as described herein.
Figure 23:
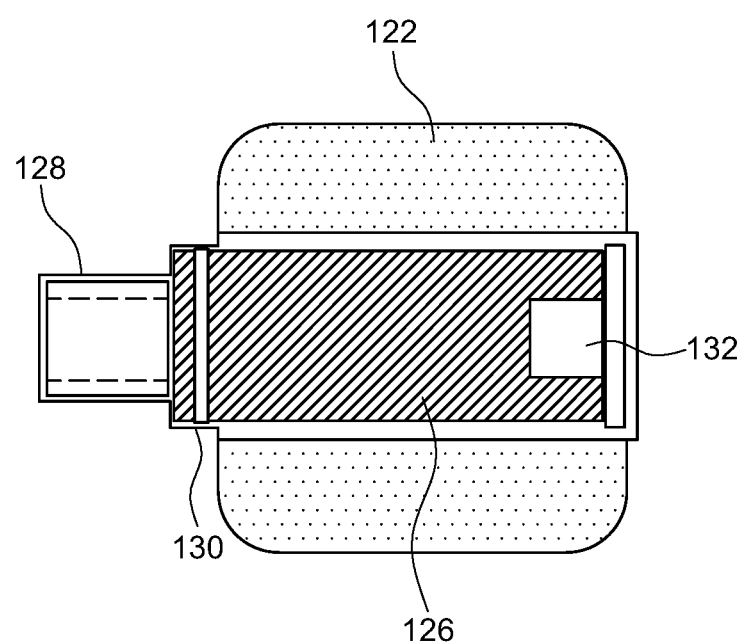
FIG. 23 is a partial top left hand perspective detail view of a frame extender and stabilizer slot of an embodiment of the Novel Design of Stabilizers for a Vehicle Cooling Module, as described herein.

Turning now to FIGS. 22 and 23, a frame extender 104, stabilizer slot 124, stabilizer pin 126, and stabilizer bushing 122 of another embodiment of the Novel Design of Stabilizers for a Vehicle Cooling Module is shown. As shown in FIG. 22, the stabilizer slot 124 is provided with a frame extender pass-through hole 134 approximately centered within the interior wall of the stabilizer slot 124. The stabilizer pin 126 is provided with a stabilizer pin thread 128 or other removably attachable arrangement, by which the stabilizer pin 126 may be attached to the radiator frame (not shown) of the cooling system module (not shown). In this way, if the stabilizer bushing 122 requires replacement, the stabilizer pin 126 may be detached from the radiator frame, for non-limiting example by unscrewing using a hex key hole 132 as shown in section view FIG. 23, or for non-limiting example by removing a cotter pin (not shown) from optional cotter pin hole 130. The stabilizer pin 126 is then withdrawn laterally through the frame extender pass-through hole 134, while the stabilizer bushing 122 is removed vertically from the upward opening of the stabilizer slot 124.

While the Novel Design of Stabilizers for a Vehicle Cooling Module has been described with respect to at least one embodiment, the Novel Design of Stabilizers for a Vehicle Cooling Module can be further modified within the spirit and scope of this disclosure, as demonstrated previously. This application is therefore intended to cover any variations, uses, or adaptations of the Novel Design of Stabilizers for a Vehicle Cooling Module using its general principles. Further, this application is intended to cover such departures from the present disclosure as come within known or customary practice in the art to which the disclosure pertains and which fall within the limits of the appended claims.

What is claimed is:

1. A Stabilizing Arrangement of a Cooling System Module of a Vehicle, comprising:
    at least one stabilizer pin attached to at least one of the vehicle cooling system module and a component of a chassis of the vehicle;
    at least one stabilizer slot incorporated into the other of the at least one of the vehicle cooling system module and the component of the chassis of the vehicle;
    at least one stabilizer bushing attached to the at least one stabilizer pin; wherein
    the at least one stabilizer pin and at least one stabilizer bushing extending laterally into and engaging with the at least one stabilizer slot wherein the at least one stabilizer pin is attached to a radiator frame of the vehicle cooling system module; and
    the at least one stabilizer slot is incorporated into at least one frame extender of the chassis of the vehicle.

2. The Stabilizing Arrangement of claim 1, wherein:
    the at least one stabilizer pin and the at least one stabilizer slot being located vertically lower than an at least one mounting arrangement of the vehicle cooling system module.

3. The Stabilizing Arrangement of claim 2, wherein:
    the at least one stabilizer slot being formed as at least one of an upwards opening U-shape and a pair of parallel vertical walls incorporated into the at least one frame extender.

4. The Stabilizing Arrangement of claim 2, wherein:
    the at least one stabilizer slot being formed as at least one round or vertically slotted hole.

5. The Stabilizing Arrangement of claim 3, wherein:
    the at least one stabilizer pin being removably attached to the radiator frame of the vehicle cooling system module; and
    the at least one frame extender being provided with at least one hole in the center of the at least one stabilizer slot configured to allow for lateral removal of the at least one stabilizer pin.

6. The Stabilizing Arrangement of claim 3, wherein:
    the at least one stabilizer pin and the at least one stabilizer slot being configured so that the at least one stabilizer bushing does not rest against the bottom of the at least one upwards opening U-shape.

7. A Vehicle having a Stabilizing Arrangement of a Cooling System Module, comprising:
    at least one stabilizer pin attached to at least one of the vehicle cooling system module and a component of a chassis of the vehicle;
    at least one stabilizer slot incorporated into the other of the at least one of the vehicle cooling system module and the component of the chassis of the vehicle;
    at least one stabilizer bushing attached to the at least one stabilizer pin; wherein
    the at least one stabilizer pin and at least one stabilizer bushing extending laterally into and engaging with the at least one stabilizer slot wherein:
    the at least one stabilizer pin is attached to a radiator frame of the vehicle cooling system module; and
    the at least one stabilizer slot is incorporated into at least one frame extender of the chassis of the vehicle.

8. The Vehicle of claim 7, wherein:
    the at least one stabilizer pin and the at least one stabilizer slot being located vertically lower than an at least one mounting arrangement of the vehicle cooling system module.

9. The Vehicle of claim 8, wherein:
    the at least one stabilizer slot being formed as at least one of an upwards opening U-shape and a pair of parallel vertical walls incorporated into the at least one frame extender.

10. The Vehicle of claim 8, wherein:
    the at least one stabilizer slot being formed as at least one round or vertically slotted hole.

11. The Vehicle of claim 9, wherein:
    the at least one stabilizer pin being removably attached to the radiator frame of the vehicle cooling system module; and
    the at least one frame extender being provided with at least one hole in the center of the at least one stabilizer slot configured to allow for lateral removal of the at least one stabilizer pin.

12. The Vehicle of claim 9, wherein:
    the at least one stabilizer pin and the at least one stabilizer slot being configured so that the at least one stabilizer bushing does not rest against the bottom of the at least one upwards opening U-shape.

13. A Method of Stabilizing a Cooling System Module of a Vehicle, comprising the steps of: attaching at least one stabilizer pin to at least one of the vehicle cooling system module
    and a component of a chassis of the vehicle;
    incorporating at least one stabilizer slot into the other of the at least one of the vehicle cooling system module and the component of the chassis of the vehicle;
    attaching at least one stabilizer bushing to the at least one stabilizer pin; wherein
    the at least one stabilizer pin and at least one stabilizer bushing extending laterally into and engaging with the at least one stabilizer slot:
    attaching the at least one stabilizer pin to a radiator frame of the vehicle cooling system module; and
    incorporating the at least one stabilizer slot into at least one frame extender of the chassis of the vehicle.

14. The Method of claim 13, further comprising the steps of:
    forming the at least one stabilizer slot as at least one of an upwards opening U-shape and a pair of parallel vertical walls incorporated into the at least one frame extender.

15. The Method of claim 14, further comprising the steps of:
    removably attaching the at least one stabilizer pin to the radiator frame of the vehicle cooling system module; and
    providing the at least one frame extender with at least one hole in the center of the at least one stabilizer slot configured to allow for lateral removal of the at least one stabilizer pin.

* * * * *